United States Patent
Dull et al.

(10) Patent No.: US 9,421,822 B2
(45) Date of Patent: Aug. 23, 2016

(54) CASTOR WHEEL ASSEMBLY

(71) Applicant: INAUTEC PTY LIMITED, Cooranbong, New South Wales (AU)

(72) Inventors: Graham Lloyd Dull, Dubbo (AU); Clinton Anthony Dull, Maitland (AU)

(73) Assignee: INAUTEC PTY LIMITED, Cooranbong, New South Wales (AU)

( * ) Notice: Subject to any disclaimer, the term of this patent is extended or adjusted under 35 U.S.C. 154(b) by 0 days.

(21) Appl. No.: 14/438,803

(22) PCT Filed: Mar. 12, 2013

(86) PCT No.: PCT/AU2013/000227
§ 371 (c)(1),
(2) Date: Apr. 27, 2015

(87) PCT Pub. No.: WO2014/066925
PCT Pub. Date: May 8, 2014

(65) Prior Publication Data
US 2015/0298504 A1    Oct. 22, 2015

(30) Foreign Application Priority Data

Oct. 30, 2012 (AU) .................... 2012904785

(51) Int. Cl.
*B60B 33/04* (2006.01)
*B60B 33/02* (2006.01)
(Continued)

(52) U.S. Cl.
CPC .............. *B60B 33/021* (2013.01); *B60B 33/006* (2013.01); *B60B 33/0039* (2013.01); *B60B 33/02* (2013.01); *B62B 5/00* (2013.01); *B60B 2200/45* (2013.01)

(58) Field of Classification Search
CPC .............. B60B 33/006; B60B 33/0065; B60B 33/0076; B60B 33/0071; B60B 33/0068; B60B 33/04
See application file for complete search history.

(56) References Cited

U.S. PATENT DOCUMENTS 2,915,319 A * 12/1959 Kumler .................. B62D 7/026
                                                                 180/410
3,235,283 A *  2/1966 De Voghel ............... B62D 3/02
                                                                 180/409

(Continued)

FOREIGN PATENT DOCUMENTS

| AU | 2005237657 | 11/2005 |
| JP | 2008030549 | 2/2008 |
| WO | 9924268 | 5/1999 |

OTHER PUBLICATIONS

Yasushi Nakayama, Driven Wheel Turning Restriction Mechanism for Unmanned Conveying Vehicle, Feb. 14, 2008, JPO, JP 2008-030549 A, Machine Translation of Description.*

(Continued)

*Primary Examiner* — James English
(74) *Attorney, Agent, or Firm* — Neal, Gerber & Eisenberg LLP

(57) ABSTRACT

A trolley having two castor wheel assemblies mounted to a trolley frame. The castor wheel assemblies are mounted toward a rear of the trolley frame whereas another pair of conventional castors are mounted to the front of the trolley frame. The castor wheel assemblies are not identical insofar as swiveling of the assemblies is limited in a direction inwardly of the trolley only. It has been found that limited swiveling of one of the castor wheel assemblies only such as at an offset angle provides more efficient guided steering of the trolley.

20 Claims, 21 Drawing Sheets

(51) Int. Cl.
  *B60B 33/00* (2006.01)
  *B62B 5/00* (2006.01)

(56) References Cited

U.S. PATENT DOCUMENTS

| | | | |
|---|---|---|---|
| 4,503,943 A | | 3/1985 | Tsukui |
| 5,797,611 A | | 8/1998 | Joseph et al. |
| 6,874,800 B2 | * | 4/2005 | George .................... A61G 7/00 180/19.1 |
| 2008/0178429 A1 | * | 7/2008 | Haselsteiner ....... B60B 33/0021 16/35 R |
| 2009/0206565 A1 | * | 8/2009 | Dull .................... B60B 33/0005 280/29 |
| 2010/0024168 A1 | * | 2/2010 | Falk ....................... A61G 11/00 16/35 R |
| 2012/0042472 A1 | * | 2/2012 | Aubin ................. B60B 33/0015 16/46 |
| 2014/0262559 A1 | * | 9/2014 | DeChristopher ... B60B 33/0068 180/6.2 |
| 2014/0312588 A1 | * | 10/2014 | Davis ..................... B60B 30/00 280/87.041 |

OTHER PUBLICATIONS

International Search Report for PCT/AU2013/000227, Completed by the Australian Patent Office on Jun. 28, 2013, 4 Pages.

* cited by examiner

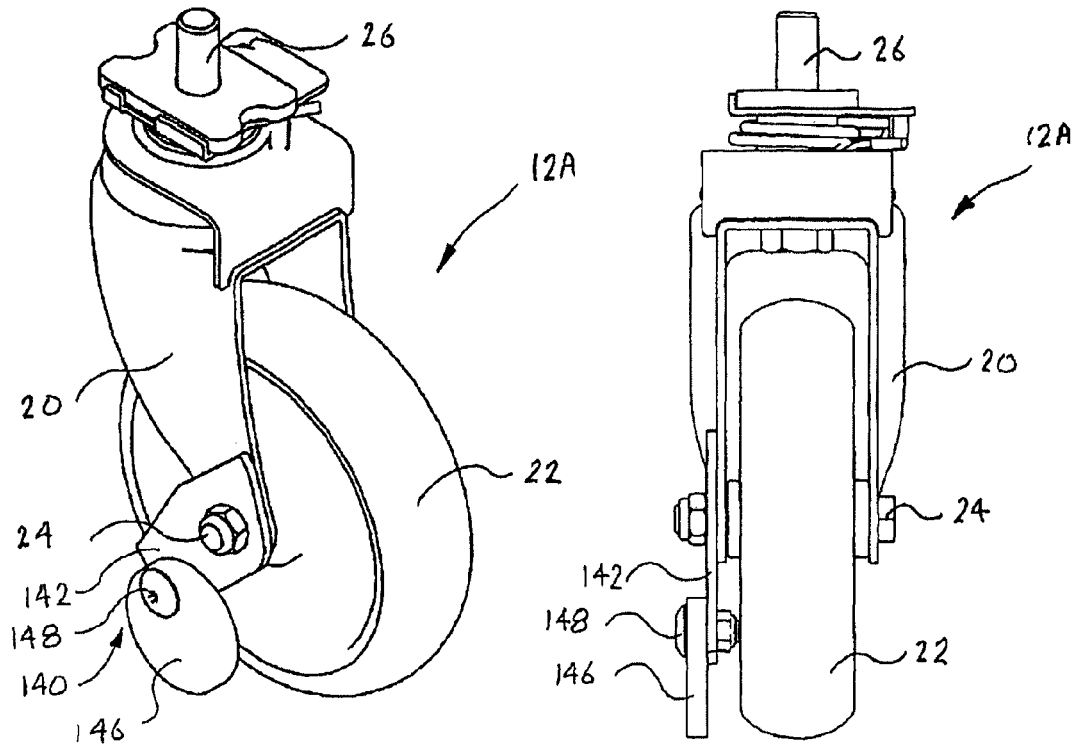
Figure 44
Figure 45
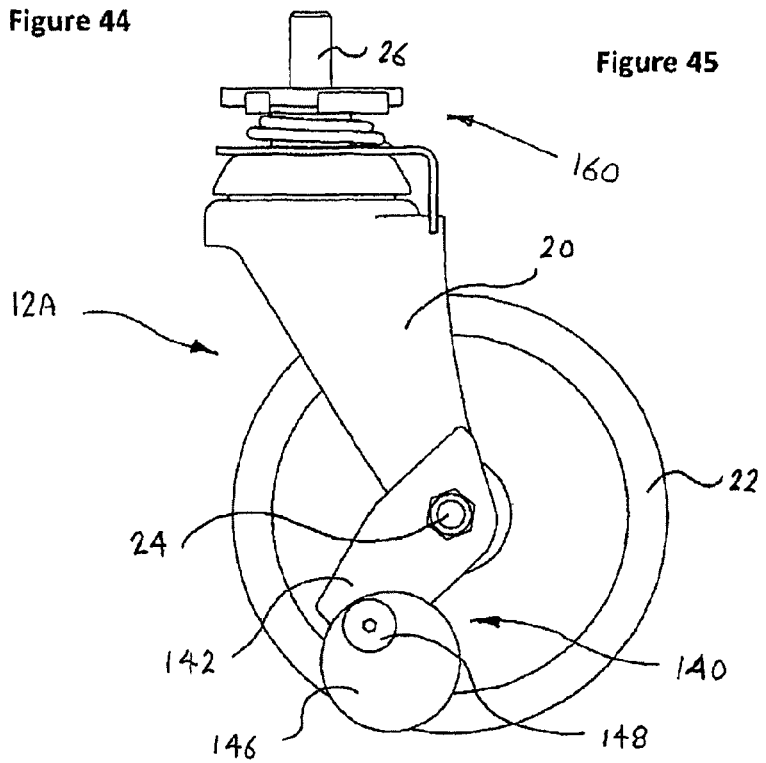
Figure 46

CASTOR WHEEL ASSEMBLY

CROSS-REFERENCE TO RELATED APPLICATIONS

This application is the U.S. national phase of PCT Application No. PCT/AU2013/000227 filed on Mar. 12, 2013, which claims priority to AU Patent Application No. 2012904785 filed on Oct. 30, 2012, the disclosures of which are incorporated in their entirety by reference herein.

TECHNICAL FIELD

The present invention relates broadly to a castor wheel assembly. The invention also relates generally to a trolley including a castor wheel assembly, such as a shopping trolley.

BACKGROUND

Trolleys with swiveling castor wheels are generally heavy and unwieldy to steer and are particularly difficult to control when they are loaded. Maneuvering a trolley utilizing the handrail provided at the rear of the trolley is no easy task, and involves a certain degree of dexterity and strength from the arm, waist and back of the user.

Users often find themselves in circumstances where they need to change the direction of travel of the trolley frequently such as when maneuvering a shopping trolley along an aisle in a supermarket. The same applies to trolley beds in hospitals and serving trolleys in restaurants and bars. When turning a trolley from standstill, the user effectively acts as the pivot about which the trolley is moved. As the front castor wheels are relatively distant from the user, a significant torsional force from the waist and lower back of the user is required in order to turn the trolley from standstill or to swing it around from the direction it is pointing. The force required for this is substantially increased when the trolley is loaded. As a result, lower back injuries and muscle strain are relatively common. The resulting muscle pain and discomfort may not be immediate, but may become apparent hours or days after trolley usage. In severe cases, muscle injuries resulting from trolley usage may exacerbate existing muscle or spine injury and in some cases, can be debilitating.

Also, an awkward situation in which users quite frequently find themselves is when pushing a trolley across a sloping or uneven surface. Trolleys are inherently susceptible to turning down a sloping surface, in which instance, the user is forced to exert a significant effort in order to maintain the trolley on track. The user must exert a constant torsional force from their back region to prevent the trolley from turning from the direction of travel while traversing the sloping surface, which again subjects the user to increased risk of back and muscle injury.

It is the ideal for trolleys that they be configured so as to make them both steerable and otherwise maneuverable. Trolleys are typically fitted with swiveling castors as the swiveling action of the castors makes the trolleys readily maneuverable. As such they can be maneuvered sideways and in any-which-way which makes them very useful in narrow, confined spaces and crowded areas. The swiveling castors are frequently used in combination with fixed wheels/castors as the fixed castors provide a degree of guidance to enable better and easier steering. Typical to the group of trolleys concerned are supermarket trolleys, platform trolleys, warehousing trolleys, prams and pushers, and trolley beds.

SUMMARY

According to the present invention there is provided a trolley comprising:

a trolley frame;
a pair of castor wheel assemblies each mounted to the trolley frame proximal its rear and comprising:
a wheel bracket;
a swivel shaft mounted to the trolley frame and about which the wheel bracket swivels;
swivel limiting means operatively coupled to the wheel bracket or the swivel shaft and arranged, on swivelling of the wheel bracket inwardly of the trolley only, to limit swivelling of the wheel bracket substantially beyond an offset angle whereby one of the castor wheel assemblies is limited in swivelling in one direction and the other castor wheel assembly is free to swivel in said one direction for guided steering of the trolley.

Preferably the trolley also comprises a preventer element mounted to the swivel shaft for engagement with the swivel limiting means which is operatively coupled to the wheel bracket to limit swivelling of the wheel bracket beyond the offset angle.

Preferably the swivel limiting means includes a stopping element mounted to the wheel bracket and configured to engage the preventer element to limit swivelling of the wheel bracket substantially beyond the offset angle. More preferably the stopping element includes a shaft opening which receives the swivel shaft for swivelling of the stopping element together with the wheel bracket.

Preferably the stopping element includes restraining means arranged to operatively engage either the wheel bracket or the preventer element to restrain swivelling of the wheel bracket as it approaches the offset angle. More preferably the restraining means includes biasing means connected to the stopping element to engage either the wheel bracket or the preventer element. Even more preferably the biasing means includes a torsion or leaf spring mounted to the stopping element and arranged to engage the wheel bracket or the preventer element as the wheel bracket swivels in said one direction and approaches the offset angle. Still more preferably the preventer element includes a cam fixed to the swivel shaft and arranged for increased pressing engagement with the torsion or leaf spring as the wheel bracket swivels and approaches said offset angle. Alternatively the biasing means is in the form of a coil spring and is connected to the preventer element wherein swivelling of the wheel bracket increases the biasing force in the coil spring as the wheel bracket approaches the offset angle.

Preferably the castor wheel assembly further comprises other biasing means operatively coupled between the wheel bracket and the swivel shaft to urge said bracket away from the offset angle. More preferably the other biasing means includes a torsion spring mounted about the swivel shaft and configured to operatively engage the stopping element and the preventer element. Still more preferably the other biasing means is the same component as the biasing means of the stopping element.

Alternatively the castor wheel assembly or the trolley also comprises a preventer element mounted to the wheel bracket for engagement with the swivel limiting means which is operatively coupled to the swivel shaft to limit swivelling of the wheel bracket beyond the offset angle. In this alternative embodiment the swivel limiting means includes a stopping element mounted to the swivel shaft and configured to engage the preventer element to limit swivelling of the wheel bracket substantially beyond the offset angle. Preferably the stopping element includes restraining means arranged to operatively engage either the wheel bracket or the preventer element to restrain swivelling of the wheel bracket as it approaches the offset angle. More preferably the restraining means includes biasing means connected to the stopping element to engage either the wheel bracket or the preventer element. Still more preferably the biasing means includes a torsion or leaf spring mounted to the stopping element and arranged to engage the wheel bracket or the preventer element as the wheel bracket swivels in said one direction and approaches the offset angle.

Preferably the castor wheel assembly also comprises a reversing brake assembly operatively coupled to the wheel bracket so that on reverse movement of the trolley the reversing brake assembly contacts the ground in a braking action to urge the wheel bracket to swivel freely in an opposite direction. More preferably the reversing brake assembly includes a brake bracket mounted to the wheel bracket, and a brake pad coupled to the brake bracket wherein the brake pad is offset laterally from a rotational axis of the swivel shaft whereby braking contact of the brake pad with the ground urges the wheel bracket to swivel in said one direction. Even more preferably the brake pad is eccentrically mounted to the brake bracket so that reverse movement of the trolley urges the brake pad into braking contact with the ground to promote swivelling of the wheel bracket in the opposite direction.

Alternatively the castor wheel assembly still further comprises release means operatively coupled to the swivel limiting means to disengage it from the preventer element to permit swivelling of the wheel bracket beyond the offset angle. More preferably the release means is connected to the stopping element to allow its displacement from the preventer element for disengagement.

Preferably the release means is designed at a predetermined force between the stopping element and the preventer element to disengage said elements to allow the castor wheel assembly to swivel in said one direction beyond the offset angle. More preferably the stopping element and the preventer element are configured so that on reverse movement of the trolley the force between said elements is sufficient to disengage them for swivelling beyond the offset angle in said one direction.

Preferably the castor wheel assembly also comprises further biasing means operatively coupled to the stopping element to urge it into engagement with the preventer element on swivelling of the wheel bracket in said one direction. More preferably said biasing means includes a compression spring mounted about the swivel shaft.

Preferably the offset angle for guided steering is between about 15° to 35°. More preferably the offset angle is at about 35°.

Preferably the castor wheel assembly or the trolley also comprises a wheel rotationally mounted to the wheel bracket.

Preferably the trolley is selected from the group consisting of a platform trolley, a shopping trolley and a pram or pusher.

BRIEF DESCRIPTION OF THE DRAWINGS

In order to achieve a better understanding of the nature of the present invention preferred embodiments of a castor wheel assembly will now be described, by way of example only, with reference to the accompanying drawings in which:

FIG. 44 is a perspective view of an eighth embodiment of a castor wheel assembly according to the invention;

FIG. 45 shows a rear view of the castor wheel assembly of the eighth embodiment;

FIG. 46 shows a side view of the castor wheel assembly of the eighth embodiment;

DETAILED DESCRIPTION

As shown in FIGS. 1 to 4 there is a trolley 10 comprising two castor wheel assemblies 12A and 12B mounted to a trolley frame 14. The castor wheel assemblies 12A/12B are mounted toward a rear of the trolley frame 14 whereas another pair of conventional castors 16A and 16B are mounted to the front of the trolley frame 14. The castor wheel assemblies 12A/12B are not identical insofar as swivelling of the assemblies is limited in a direction inwardly of the trolley 10 only. This means the left rear castor wheel assembly 12A is limited when swivelling in anticlockwise direction only whereas the right rear castor wheel assembly 12B is limited in swivelling in its clockwise direction only. The castor wheel assemblies 12A and 12B are otherwise free to swivel without limitation in their clockwise and anticlockwise directions, respectively.

Figure 1:
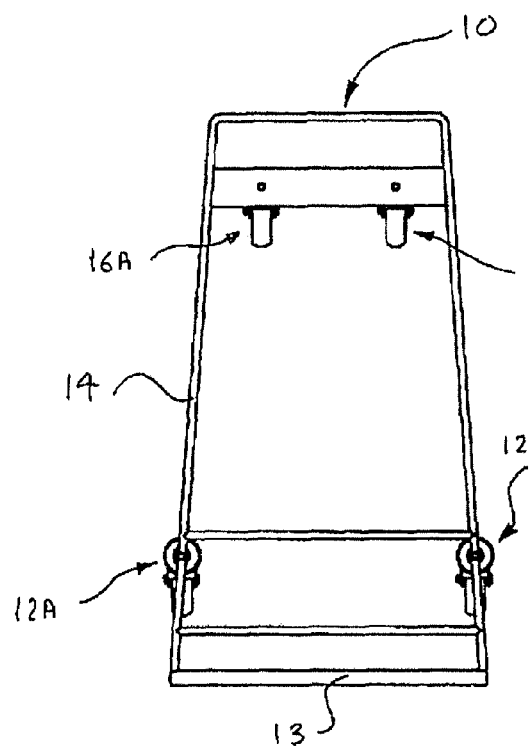
FIG. 1 is a plan view of a supermarket trolley including a pair of castor wheel assemblies according to an embodiment of the present invention.
Figure 2:
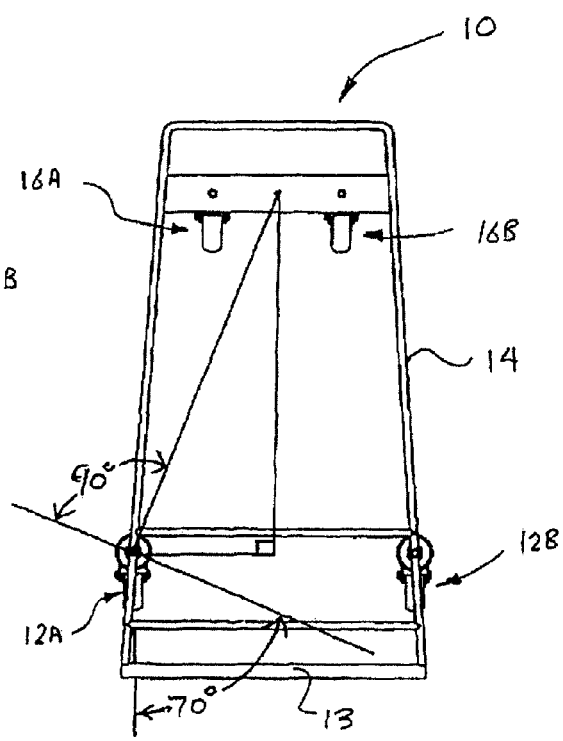
FIG. 2 is a plan view of the supermarket trolley of FIG. 1 with lines and angles depicting possible swivelling of the castor wheel assemblies.
Figure 3:
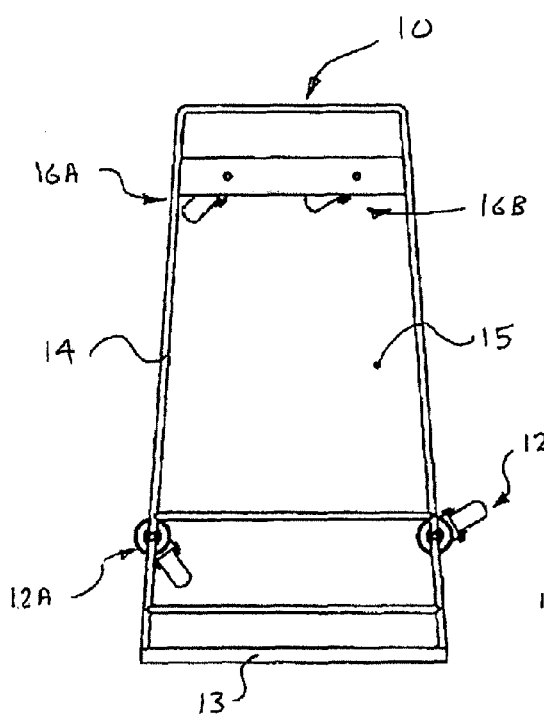
FIG. 3 is a plan view of the supermarket trolley of FIGS. 1 and 2 showing the castor wheel assemblies in a turning position.
Figure 4:
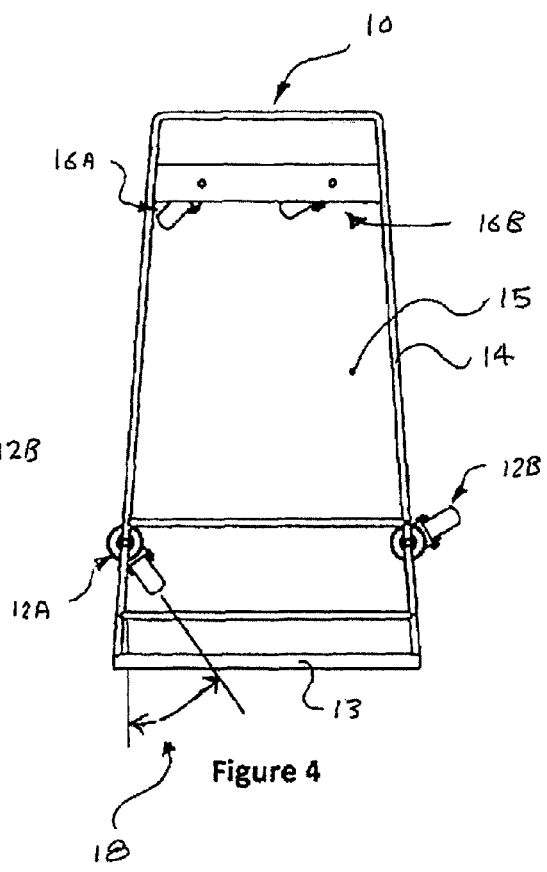
FIG. 4 is a plan view of the castor wheel assembly of FIG. 3 with lines and angles depicting swivelling of the castor wheel assemblies in the turning position.

As shown in FIGS. 3 and 4 the trolley 10 has its left rear castor assembly 12A operative when turning to the right. The right rear castor assembly 12B is free to swivel without limitation when turning to the right. The front swivelling castors 16A and 16B are free to swivel without limitation in both directions. It has been found that limiting swivelling of one of the castor wheel assemblies only such as 12A at an offset angle 18 provides more effective guided steering of the trolley 10. The offset angle at between 30° to 40° is understood to be most effective in manoeuvring of the trolley 10. It has also been found that an offset angle of around 35° provides a "sweet spot" in manoeuvring the trolley 10. It will be appreciated that the offset angle is measured from the direction at which the castor wheel assembly such as 12A or 12B would otherwise be oriented if it or the trolley 10 were travelling straight ahead without turning.

FIGS. 5 to 43 illustrates various embodiments of castor wheel assemblies such as 12A taken from the trolley 10 of FIGS. 1 to 4. For ease of reference and in order to avoid repetition, corresponding components of the various castor wheel assemblies have been designated with the same reference numerals. The castor wheel assembly 12A of each of these embodiments is limited when swivelling in an anti-clockwise direction and is otherwise free to swivel without limitation in a clockwise direction. The other castor wheel assembly 12B is constructed of essentially the same components but with the relevant components reoriented or reversed to effect limiting of the swivelling motion in the clockwise direction whilst permitting free swivelling without limitation in the anticlockwise direction.

Figure 5:
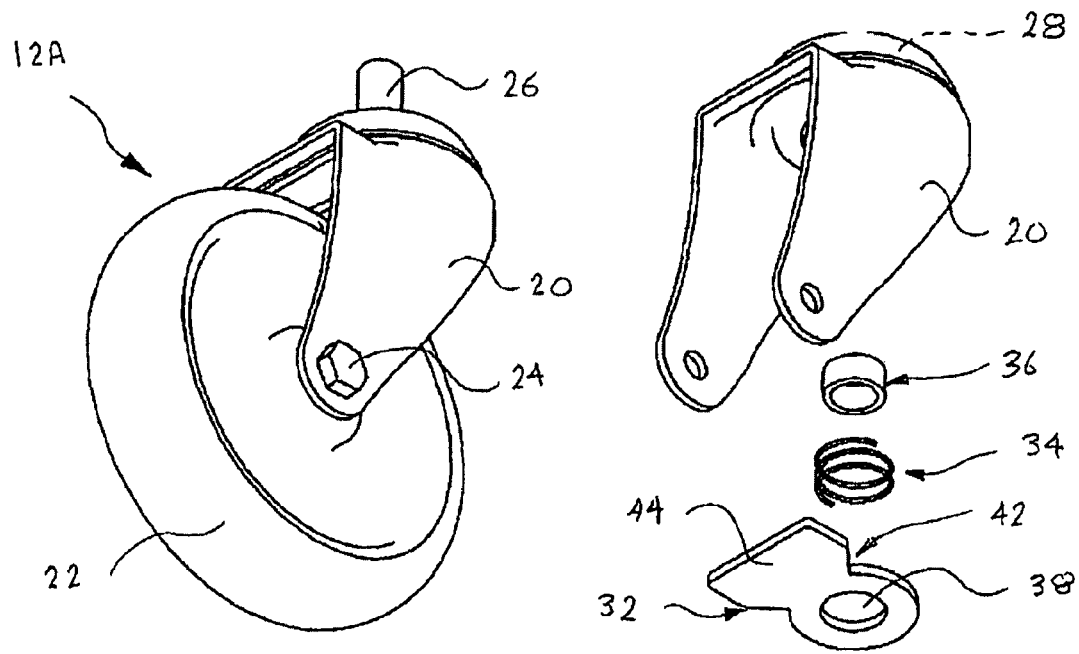
FIG. 5 is a perspective view of a first embodiment of a castor wheel assembly according to the invention.
Figure 6:
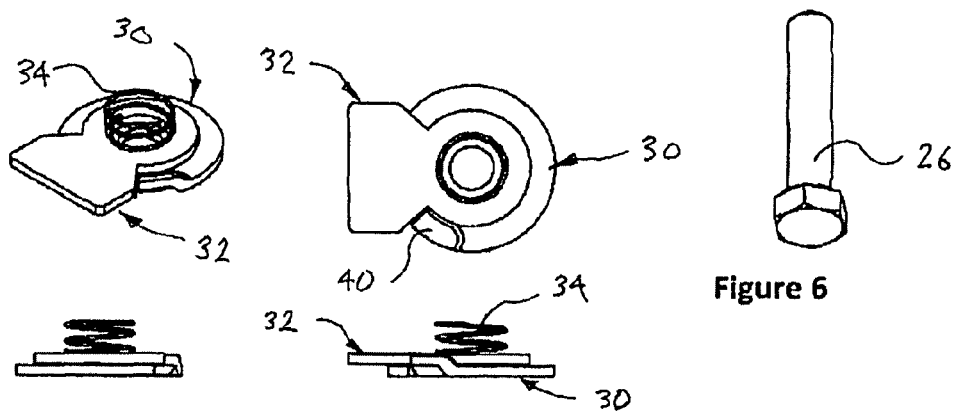
FIG. 6 is an exploded view of the castor wheel assembly of the first embodiment.
Figure 7:
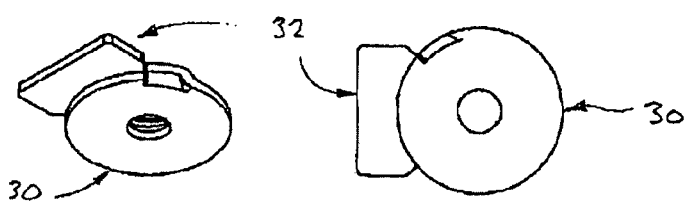
FIG. 7 shows various views depicting key components of the castor wheel assembly of the first embodiment.
Figure 8:
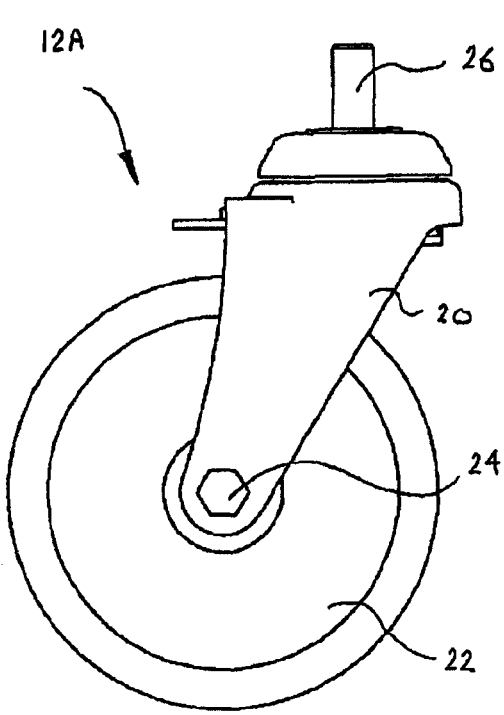
FIG. 8 is a side view of a second embodiment of a castor wheel assembly according to the invention.
Figure 9:
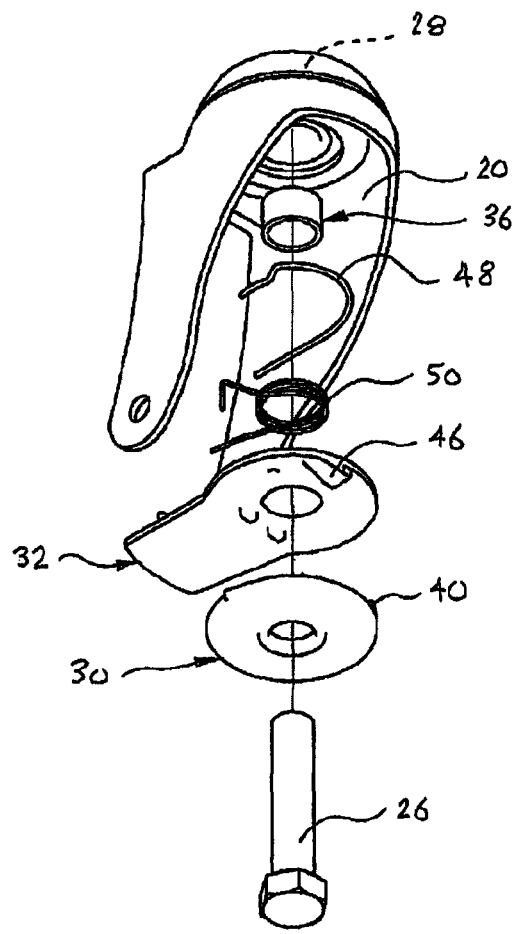
FIG. 9 is an exploded view of the castor wheel assembly of the second embodiment.
Figure 10:
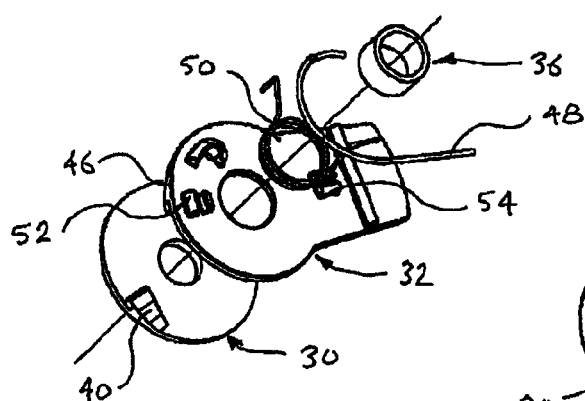
FIG. 10 is an exploded view of key components of the castor wheel assembly of the second embodiment.
Figure 11:
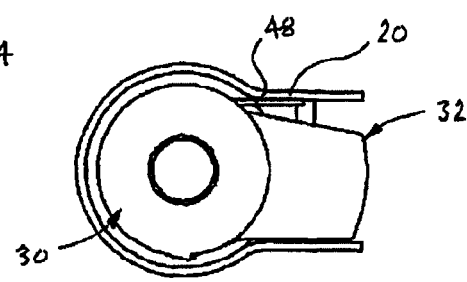
FIG. 11 is a bottom view of the key components of FIG. 10 fitted to a wheel bracket of the castor wheel assembly of the second embodiment.

FIGS. 5 to 7 illustrate a first embodiment of a castor wheel assembly 12A comprising a wheel bracket 20 having a wheel 22 rotationally coupled to it via axle 24. The wheel bracket 20 swivels about a swivel shaft 26 via a bearing assembly 28 associated with the wheel bracket 20. The castor wheel assembly 12A also comprises a preventer element 30 mounted to the swivel shaft 26. The castor wheel assembly 12A further comprises swivel limiting means operatively coupled to the wheel bracket 20 to engage the preventer element 30 to limit swivelling of the wheel bracket 20 and the associated wheel 22 substantially beyond the offset angle for guided steering. In the first embodiment the swivel limiting means includes a stopping element 32 mounted to the wheel bracket 20 and configured to engage the preventer element 30 to limit swivelling of the wheel bracket 20 substantially beyond the offset angle. This engagement occurs only on swivelling of the wheel bracket 20 in one direction only, or in this case anticlockwise, for guided steering with the aid of the castor wheel assembly 12A.

The castor wheel assembly 12A of the first embodiment also comprises further biasing means in the form of a compression spring 34 operatively coupled to the stopping element 32 to urge it into engagement with the preventer element 30 on swivelling of the wheel bracket 20 in said one direction. The compression spring 34 is mounted about the swivel shaft 26 and locates between a bottom face of the wheel bracket 20 and an upper face of the stopping element 32. In this first embodiment the preventer element 30 is fixed rigidly to the bearing assembly 28 via the swivel shaft 26. The castor wheel assembly 12A also comprises a spacer 36 which is fastened intermediate the preventer element 30 and the base of the bearing assembly 28. The compression spring 34 and a shaft opening 38 formed in the stopping element 32 locate around and are free to swivel about the spacer 36.

In the first embodiment the preventer element 30 is in the form of disc having an upwardly directed protrusion 40 formed about its perimeter. The stopping element 32 includes a rebate 42 in its perimeter edge designed to abut the protrusion 40 on swivelling of the wheel bracket 20 to approximately the offset angle. The stopping element 32 via its rear leg 44 aligns to the wheel bracket 20. The preventer element or disc 30 is appropriately aligned to the trolley frame such as 14 at the required angle and rigidly fixed wherein abutment or engagement of the stopping element 32 and the preventer element 30 occur on anticlockwise swivelling of the wheel bracket 20 to the offset angle. The compression spring 34 provides a dampening to the stopping element 32 and allows the stopping element 32 to lift and ride over the protrusion 40 when the wheel bracket 20 is swivelled in the clockwise direction.

In the first embodiment of the castor wheel assembly 12A the swivel limiting means or stopping element 32 and the preventer element 30 provide swivelling in the operative direction to a fixed point at about the offset angle. The other five embodiments of the castor wheel assembly are designed to limit swivelling up to a variable point depending on the swivel load applied to the castor wheel assembly 12A but ordinarily limiting swivelling of the wheel bracket 20 up to an offset angle of between 30° to 40°.

FIGS. 8 to 14 illustrate a second embodiment of the castor wheel assembly 12A. The preventer element or disc 30 of this embodiment is similar to the first embodiment having a protrusion 40 located about its perimeter and designed to engage or abut a corresponding protrusion 46 located in a lower perimeter surface of the stopping element 32. The stopping element 32 of this embodiment also includes restraining means in the form of a relatively heavy leaf spring 48 arranged to operatively engage the wheel bracket 20 to restrain swivelling of the wheel bracket 20 as it approaches the offset angle. The leaf spring 48 is secured to an upper surface of the stopping element 32. The castor wheel assembly 12A of the second embodiment also comprises other biasing means in the form of a relatively light torsion spring 50 operatively coupled between the stopping element 32 and the preventer element 30. This torsion spring 50 provides a light tension from about 0° to 25° to reduce wheel wobble and provide a smooth steering action. The heavy leaf spring 48 provides a 10° variable restraint from around 25° to 35° at the required offset angle.

Figure 12:
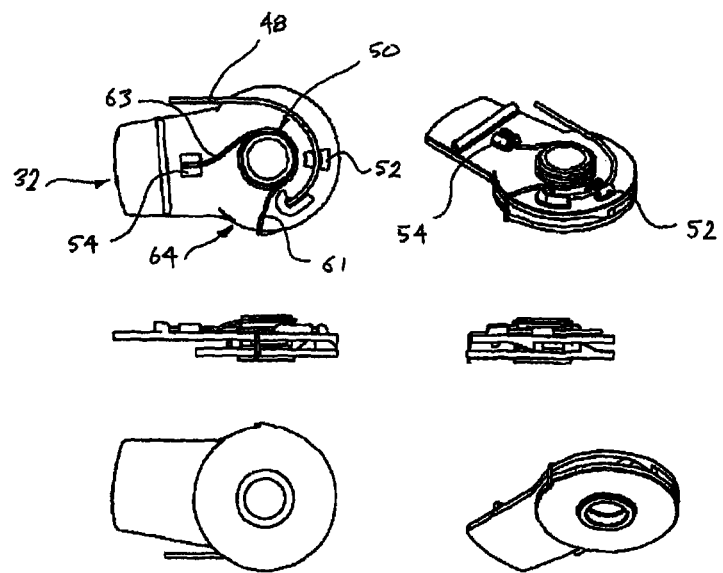
FIG. 12 shows various views of key components of the castor wheel assembly of the second embodiment.
Figure 13:
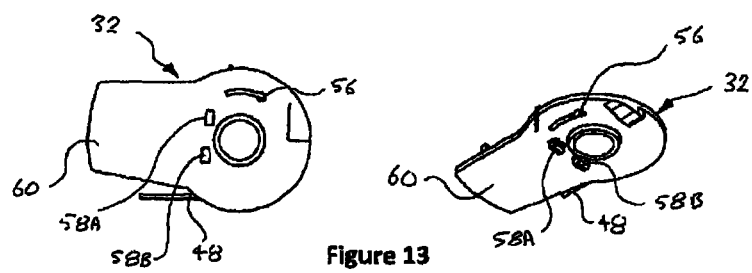
FIG. 13 shows a bottom and perspective view of the key components of the castor wheel assembly of the second embodiment.

FIG. 12 shows six different views of the relationship of key components of the castor wheel assembly 12A of this second embodiment. The stopping element 32 is provided with lugs such as 52 and 54 which retain and position the leaf spring 48 and the torsion spring 50, respectively. These key components are shown with the castor wheel assembly 12A in the straight ahead position where for example the protrusion 46 of the stopping element 32 is offset at around 25° relative to the protrusion 40 of the preventer element 30. FIG. 13 shows two underside views of the key components with the heavy leaf spring 48 at one end inserted through a hole 56 in the stopping element 32 to securely hold it in position. The stopping element 32 also includes a pair of legs 58A and 58B protruding downwardly from its lower face and designed to rock on an upper face of the disc shaped preventer element 30. The pair of legs 58A/B together with a foot extension 60 of the stopping element 32 together form release means to disengage the stopping element 32 from the preventer element 30 to permit swivelling of the wheel bracket 20 beyond the offset angle. In operation the foot extension or pedal 60 of the stopping element is depressed allowing the protrusion 46 of the stopping element 32 to rise above and around the corresponding protrusion 40 of the preventer element 30.

Figure 14:
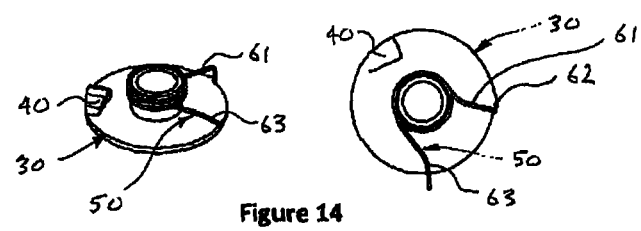
FIG. 14 shows a perspective and top view of other key components of the castor wheel assembly of the second embodiment.
Figure 15:
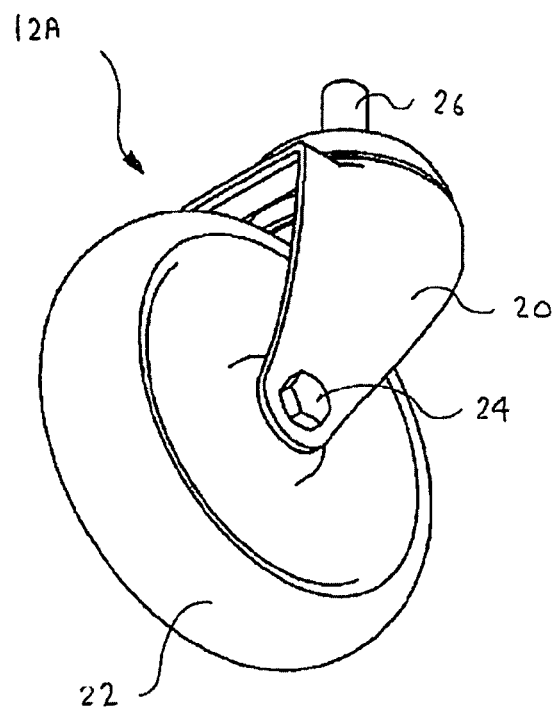
FIG. 15 is a perspective view of a third embodiment of a castor wheel assembly according to the invention.
Figure 16:
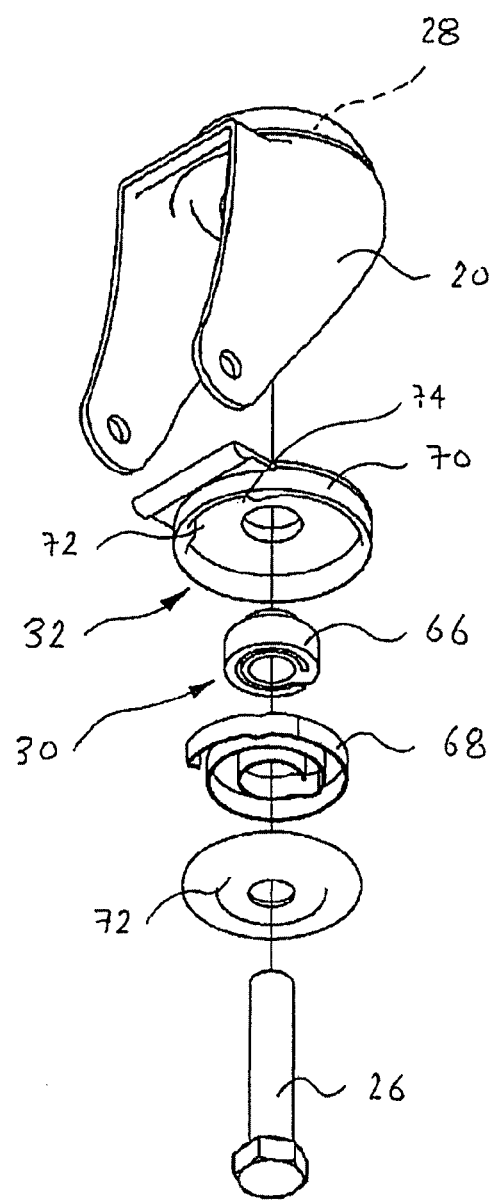
FIG. 16 is an exploded view of the castor wheel assembly of the third embodiment.

The light torsion spring 50 as shown in FIG. 14 includes an extension arm 61 arranged to engage a small lug 62 protruding outwards on an outer perimeter of the preventer 30. The other extension arm 63 of the torsion spring 50 is retained within the lugs 54 of the stopping element 32. The extension arm 61 of the light torsion spring 50 disengages from the small lug 62 on activation or depressing of the foot extension 60. The stopping element 32 also includes a ramp 64 which on relative rotation between the stopping element 32 and the preventer element 30 pushes the extension arm 61 on the torsion spring 50 outwards and away from the lug 62 of the preventer element 30 (see FIG. 12).

In this second embodiment the swivel limiting means or stopping element 32 engages the preventer element 30 at an offset of around 25°. With continued turning or swivelling pressure applied to the castor wheel assembly 12A the relatively heavy leaf spring 48 flexes and allows the stopping element 32 to rotate a further about 10°. The foot extension 60 of the stopping element 32 then contacts the wheel bracket 20 at the required offset angle of around 35°. This design provides swivel limiting means with increasing pressure applied at between 25° and 35°. The castor wheel assembly 12A can also be disengaged for reversing of the associated trolley such as 10 by activating the release means or foot extension 60.

FIGS. 15 to 18 illustrate a third embodiment of the castor wheel assembly 12A. In this example the preventer element 30 includes another spacer 66 rigidly secured to the bearing assembly 28 via the swivel shaft 26. The restraining means of this embodiment includes a coil spring 68 connected at its inner region to the other spacer 66 and arranged at an outer region to engage the stopping element 32 to restrain swivelling of the wheel bracket 20 as it approaches the offset angle. In this embodiment the coil spring 68 functions both as the restraining means and also provides biasing between the stopping element 32 and the preventer element 30 to reduce wobble of the wheel bracket 20. The coil spring 68 thus reduces wobble to provide a smooth steering action from about 0° with the spring 68 tension increasing substantially through 25° to 35° providing a 10° variable limiting means to a 35° offset angle.

Figure 17:
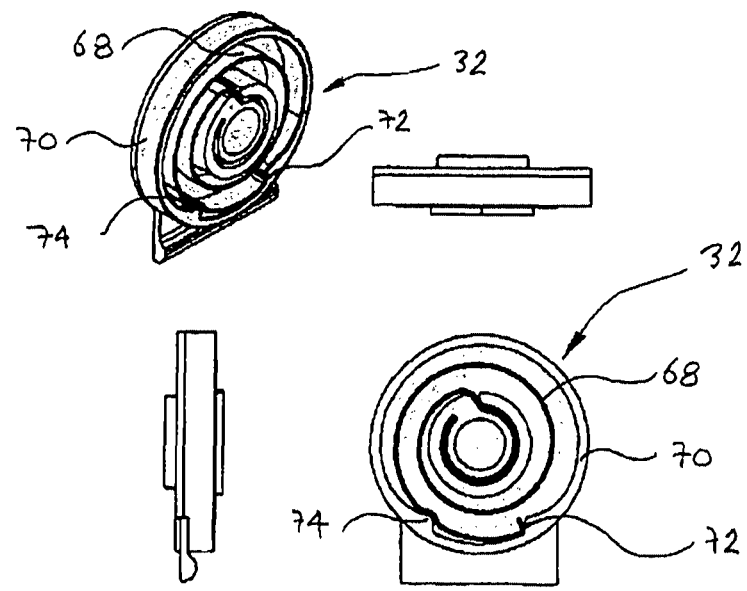
FIG. 17 shows various views of key components of the castor wheel assembly of the third embodiment.
Figure 18:
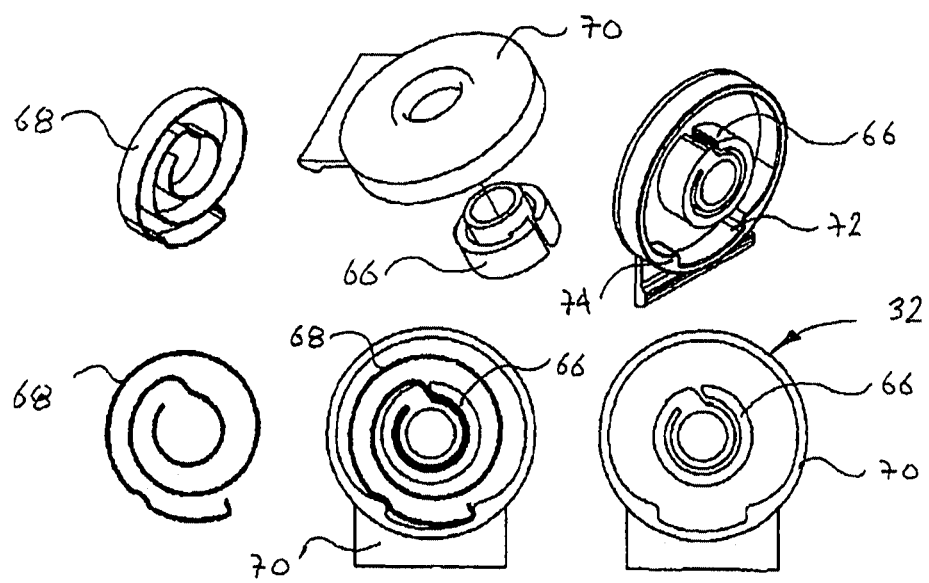
FIG. 18 shows various views of the key components of the castor wheel assembly of the third embodiment.
Figure 19:
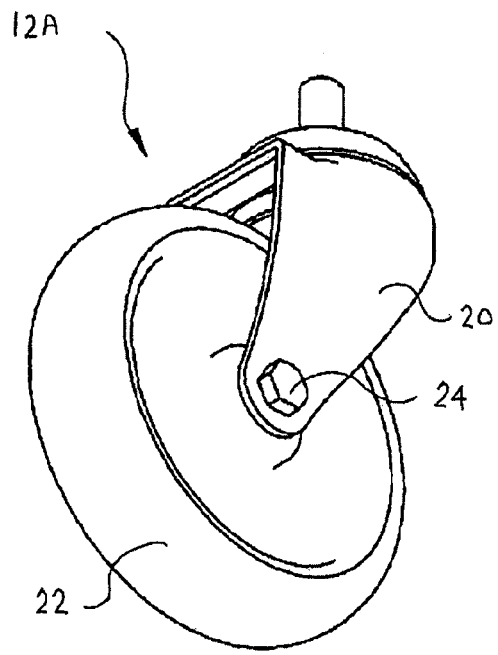
FIG. 19 is a perspective view of a fourth embodiment of a castor wheel assembly according to the invention.
Figure 20:
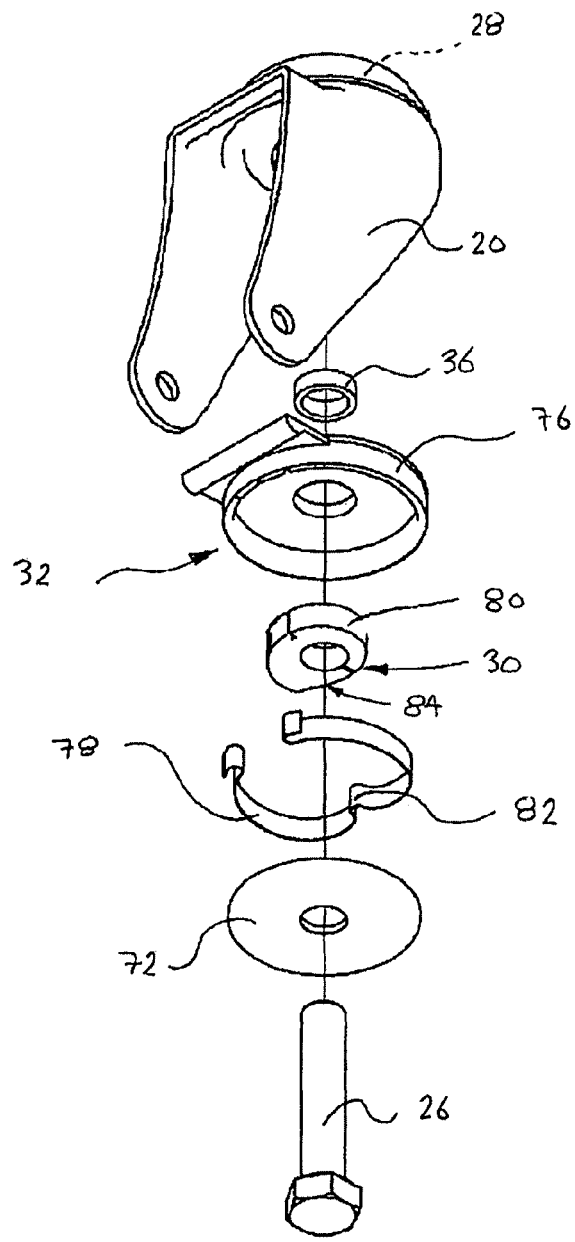
FIG. 20 is an exploded view of the castor wheel assembly of the fourth embodiment.

In the third embodiment the stopping element 32 includes a spring housing 70 for containing the coil spring 68. The housing 70 is enclosed by a housing cover 72 and also houses the spacer 66 which is rigidly fixed to the bearing assembly 28. FIGS. 17 and 18 show an underside view of the coil spring housing 70 including a rebate 72 in its internal perimeter surface for engaging an outer end of the coil spring 68. The castor wheel assembly 12A is designed so that the coil spring 68 engages the rebate 72 when the wheel bracket 20 is at or about the straight ahead position and a generally linear increase in pressure is applied to swivelling of the castor 12A in said one direction. This increasing pressure continues until the wheel brackets 20 passes the offset angle when the outer end of the coil spring 68 releases from the rebate 72. The spring housing 70 includes a ramped surface 74 on its interior perimeter surface which bears against the coil spring 68 adjacent its outer end. This ramped surface 74 applies increasing pressure to the coil spring 68 on rotation of the stopping element 32 forcing the outer end of the coil spring 68 inwards so as to disengage from the rebate 72. This combination of features provides release means which at a predetermined load allows for automatic disengagement of the stopping element from the preventer element 30, for example on reversing of the castor wheel assembly 12A. The castor wheel assembly 12A is then free to rotate in said one or in this case the anticlockwise direction for steerage in reverse.

In the third embodiment it will be appreciated that the stopping element 32, unlike the previous embodiments, is symmetrical and identical units can be fitted to both the left and right hand castor assemblies 12A and 12B. The coil spring 68 is mirror reversible and as such identical units can be fitted to both the left and the right hand castor assemblies 12A and 12B.

FIGS. 19 to 22 illustrate a fourth embodiment of a castor wheel assembly 12A wherein the swivel limiting means or stopping element 32 includes a spring housing 76 together with torsion spring 78. The preventer element 30 includes cam 80. The torsion spring 78 is in profile generally W-shaped and at each of its ends is fitting within the spring housing 76. The cam 80 is axially fixed to the bearing assembly 28 via the swivel shaft 26 and designed to bear against an intermediate ridge 82 of the torsion spring 78. An eccentric surface 84 of the cam 80 is shaped to provide greater torque as the wheel bracket 20 swivels in said one anticlockwise direction toward the offset angle and the torsion spring 78 expands outwards. The cam 80 and torsion spring 78 are thus designed and shaped to provide swivel limiting means through a variable range with predetermined variable torque. The cam 80 provides significant pressure between 25° and 35° with pressure increasing through this range. As swivelling of the castor wheel bracket 20 continues past 35° the spring 82 pressure increases further until the spring 82 moves past the cam 80 at the peak of its eccentric surface 84 and the castor bracket 20 is able to swivel freely past the swivel limiting means. The cam 80 also provides a light tension from about 0° to 25° which reduces wheel wobble and provides a smooth steering action. The torsion spring 78 thus functions both as appropriate restraining means in providing a variable range of the swivel limiting means and also as biasing means in reducing wheel wobble.

Figure 21:
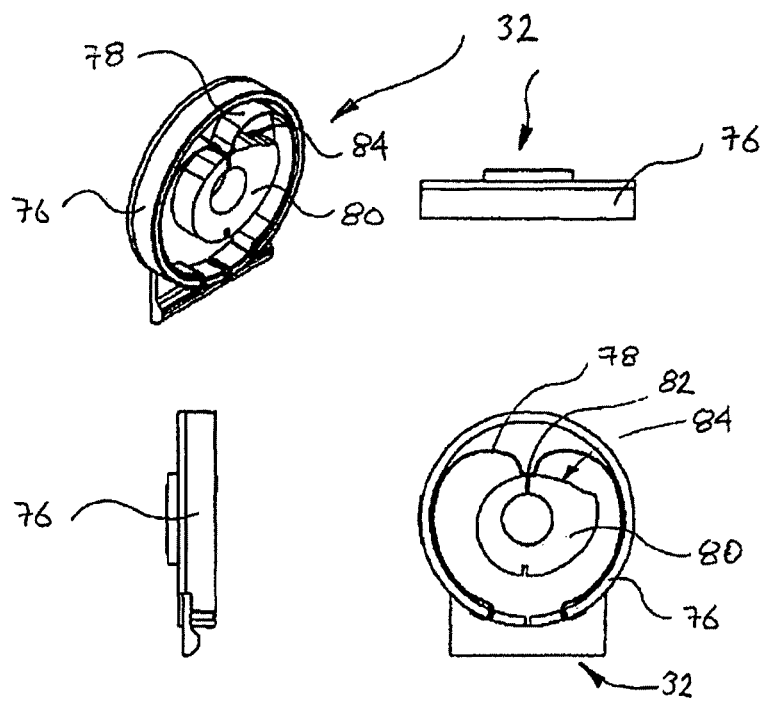
FIG. 21 shows various views of key components of the castor wheel assembly of the fourth embodiment.
Figure 22:
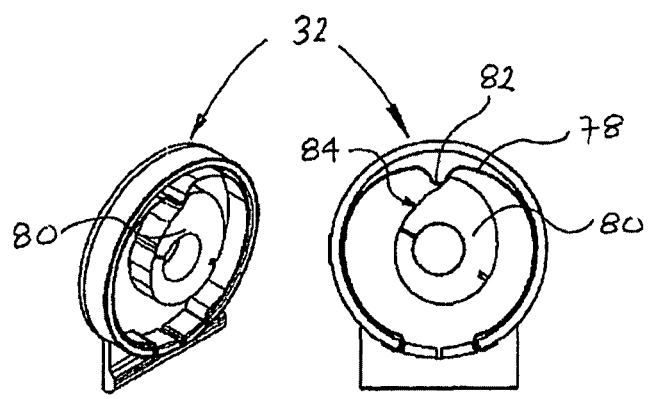
FIG. 22 shows perspective and bottom views of the key components of the castor wheel assembly of the fourth embodiment.
Figure 23:
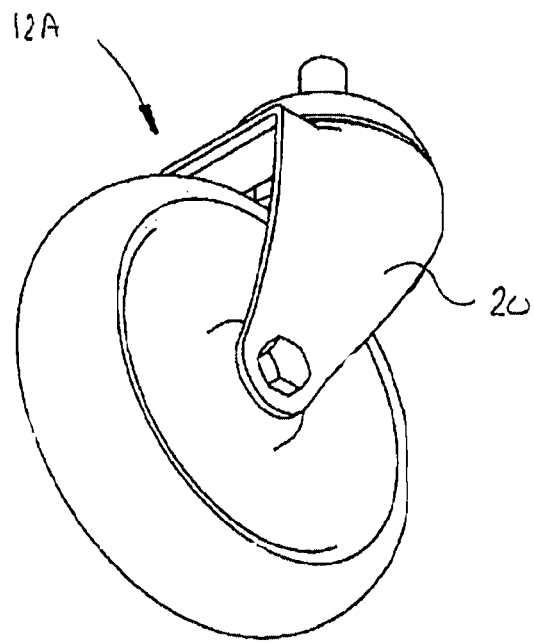
FIG. 23 is a perspective view of a fifth embodiment of a castor wheel assembly according to the invention.
Figure 24:
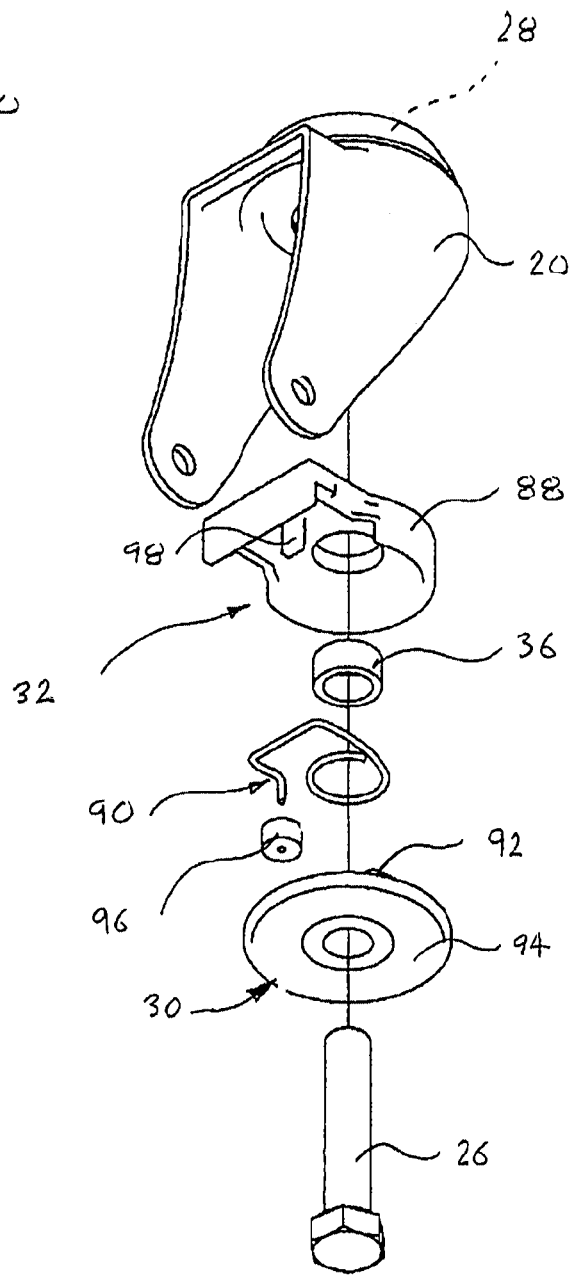
FIG. 24 is an exploded view of the castor wheel assembly of the fifth embodiment.
Figure 25:
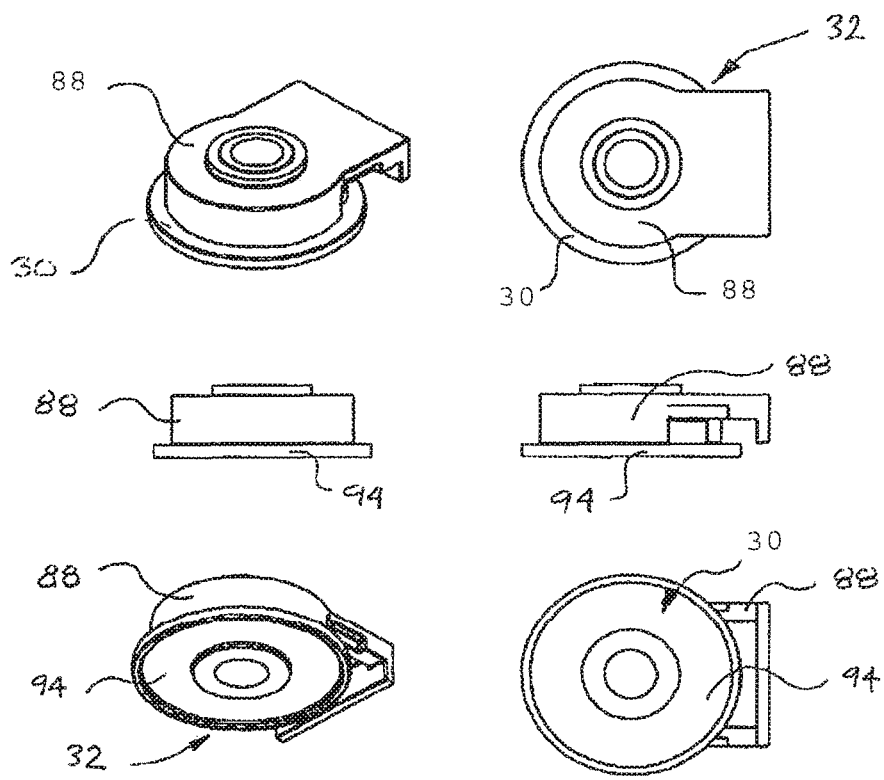
FIG. 25 shows various views of key components of the castor assembly of the fifth embodiment.
Figure 26:
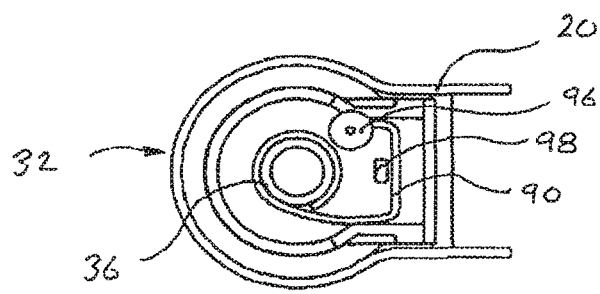
FIG. 26 is a bottom view of the key components fitted to a wheel bracket of the castor wheel assembly of the fifth embodiment.

The castor wheel assembly 12A of the fourth embodiment also comprises the spacer 36 which is axially fixed to the wheel bearing assembly 28 via the swivel axle 26 and provides a surface about which the spring housing 76 together with the torsion spring 78 rotate. The cam 80 is fixed to the spacer 36 at an angle which provides the necessary biasing in the wheel bracket 20. For example, FIG. 21 shows the castor wheel assembly 12A in its straight forward position whereas FIG. 22 shows the castor wheel assembly 12A at or approaching the offset angle. The various components of the preventer element 30 and stopping element 32 are either symmetrical or mirror reversible where identical units can be fitted to both the left and right hand castor assemblies 12A and 12B.

FIGS. 23 to 27 illustrate a fifth embodiment of the castor wheel assembly 12A. This embodiment is similar to the previous embodiment insofar as the swivel limiting means includes a spring housing 88 together with a torsion spring 90. The preventer element 30 is in the form of cam 92. The cam 92 is formed integral with a cover 94 for the spring housing 88. The cover 92 is axially fixed to the bearing assembly 28 via the swivel axle 26 and the coaxial spacer 36. The preventer element 30 of this embodiment also includes a roller 96 coupled to an outer end of the torsion spring 90 which at its inner end mounts about the spacer 36. The torsion spring 90 also locates around an anchoring leg 98 formed integral with the spring housing 88.

Figure 27:
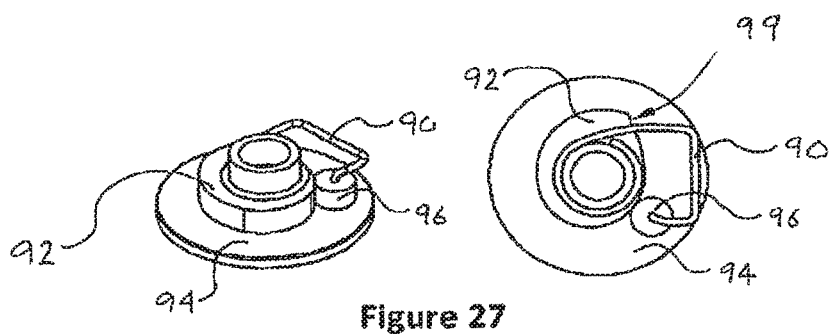
FIG. 27 shows perspective and plan views of key components of the castor wheel assembly of the fifth embodiment.
Figure 28:
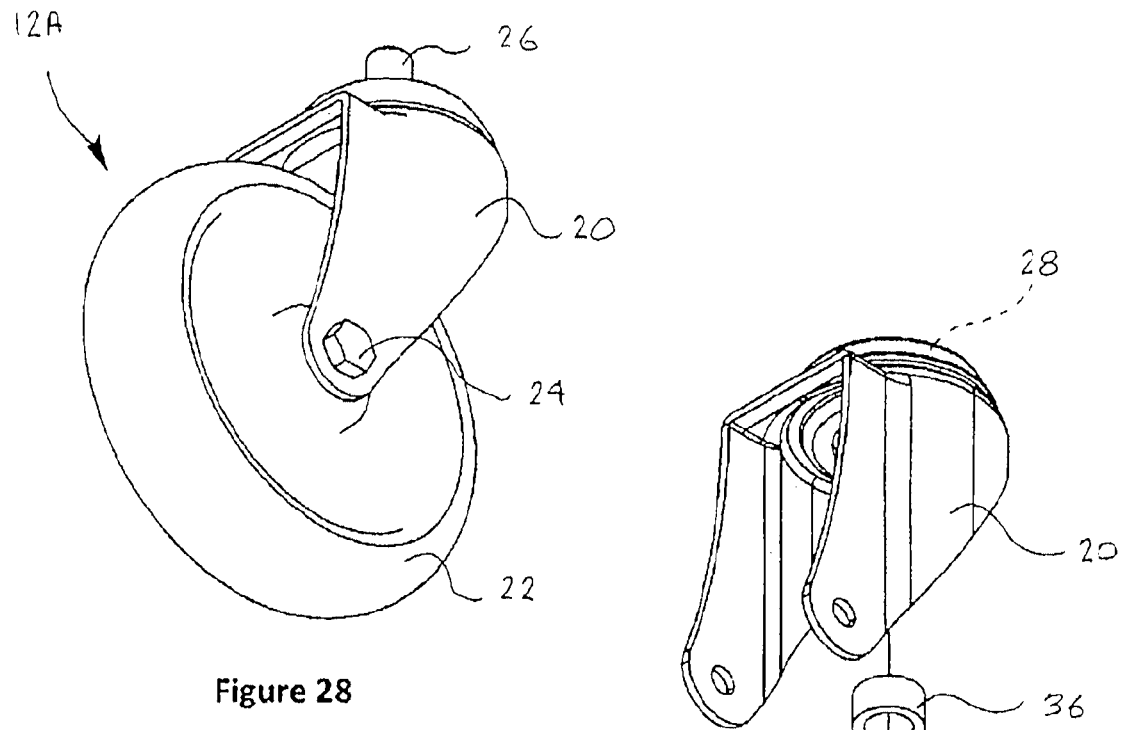
FIG. 28 is a perspective view of a sixth embodiment of a castor wheel assembly according to the invention.
Figure 29:
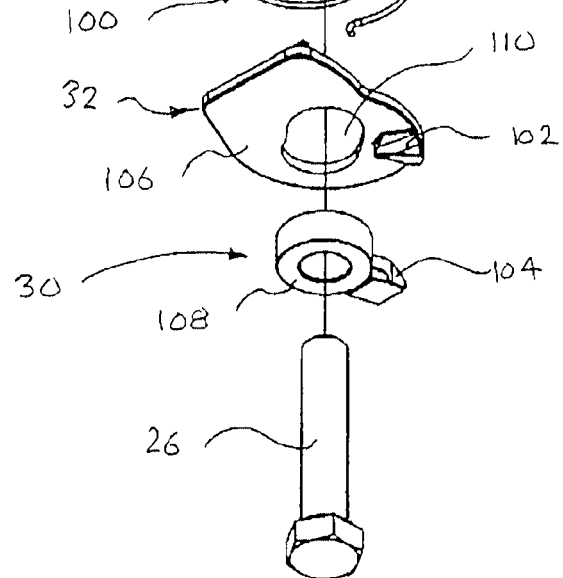
FIG. 29 is an exploded view of the castor wheel assembly of the sixth embodiment.

The housing cover 94 and the associated cam 92 are angularly fixed to the bearing assembly 28 at the required position so that the cam 92 contacts the roller 96 which is spring tensioned via the torsion spring 90. The cam 92 is designed and shaped to provide swivel limiting means through a variable range with predetermined variable torque. The cam 92 provides a significant pressure between 25° and 35° of wheel bracket 20 angle with the pressure increasing through this range. As swivelling of the wheel bracket 20 continues beyond the 35° position the torsion spring 90 pressure increases further until the roller 96 moves past the cam 92 peak peripheral surface 99 (see FIG. 27) and the wheel bracket 20 is free to swivel past the swivel limiting means. The cam 92 also provides a light tension from about 0° to 25° to reduce wheel wobble and provide a smooth steering action. The swivel limiting means is shown in FIG. 27 in a generally straight forward position of the castor wheel assembly 12A.

FIGS. 28 to 33 illustrate a sixth embodiment of the castor wheel assembly 12A. This embodiment is similar to the second embodiment except it relies upon the single coil spring 100 in providing a variable range swivel limiting means together with a release means or mechanism. The coil spring 100 also provides other biasing means which on a light tension in the coil spring 100 from about 0° reduces wheel wobble and provides a smooth steering action. The spring 100 tension increases substantially through about 25° to 35° thus providing a variable limiting means through this range. At a point beyond the limiting means range of operation, the castor wheel assembly 12A, has a release means or mechanism so that when sufficient pressure is applied to the castor wheel bracket 20, engaging lugs 102 and 104 disengage and allow the wheel bracket 20 to rotate freely past the offset angle. The lug 102 is mounted to a stopping plate 106 which oscillates about the swivel shaft 26 in conjunction with the wheel bracket 20. The coil spring 100 is at its outer end anchored to the stopping plate 106 and at an inner end mounted about the spacer 36. The preventer element 30 includes the lug 104 formed integral with a preventer collar 108. The preventer collar 108 is together with the spacer 36 fixed coaxial with one another via the swivel shaft 26 to the bearing assembly 28. The stopping plate 106 includes an elliptical-shaped opening 110 within which the spacer 36 locates for swivelling and oscillation of the spacer 106 on rotation of the wheel bracket 20.

Figure 30:
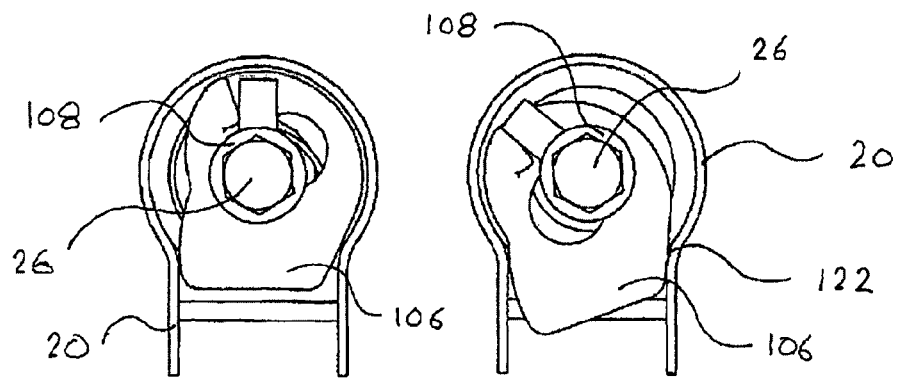
FIG. 30 shows two views of key components of the castor wheel assembly fitted to a wheel bracket of the sixth embodiment.
Figure 31:
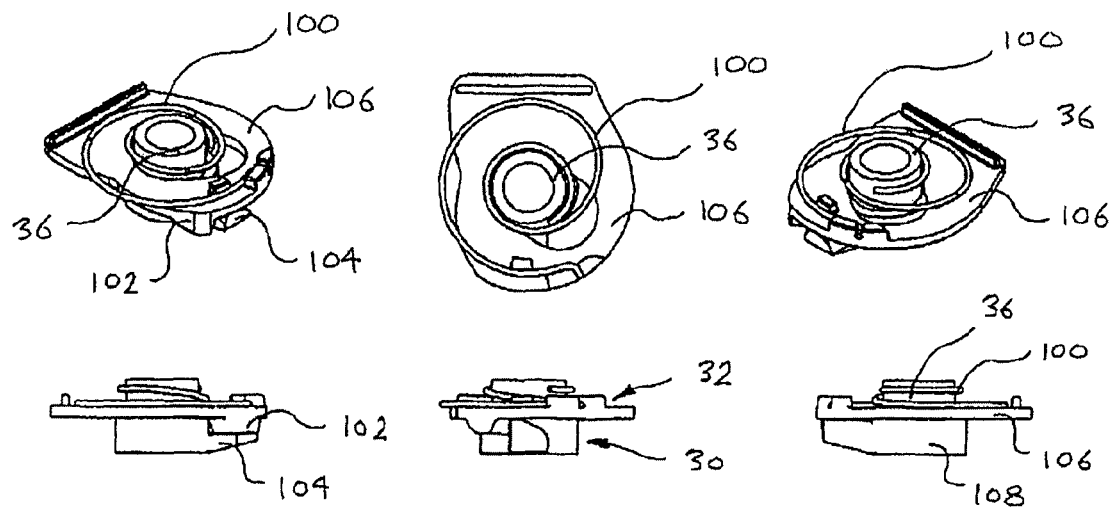
FIG. 31 shows various views of key components of the castor wheel assembly of the sixth embodiment.

The coil spring 100 locates about the spacer 36 and contacts a lower surface of the inner race of the bearing assembly 28. The purpose of the coil spring 100 is thus twofold: first it exerts a gentle pressure downwards on the stopping element 32 to engage it with the preventer element 30 while allowing the preventer element 30 to pass under the lug 102 of the stopping element 32 (the stopping 32 being lifted) when rotated in the clockwise or non-engaging direction; and secondly it exerts a strong pressure on the stopping element 32 as it is driven to oscillate by the preventer element 30 during engagement of the swivel limiting means. FIG. 30 shows both extents of oscillation of the stopping element 32.

In this embodiment the relatively gentle pressure of the coil spring 100 to dampen the stopping element 32 is achieved because a flex of only a few millimeters is required to do so and this flex is distributed throughout the length of the coil spring 100. The heavier spring tension required to supply the appropriate load to provide the limiting means is achieved because a much greater flexing of the spring 100 is required in this instance. In both cases, efficient use of the spring 100 is made as the flex is achieved throughout virtually the entire extent of the spring's 100 length.

Figure 32:
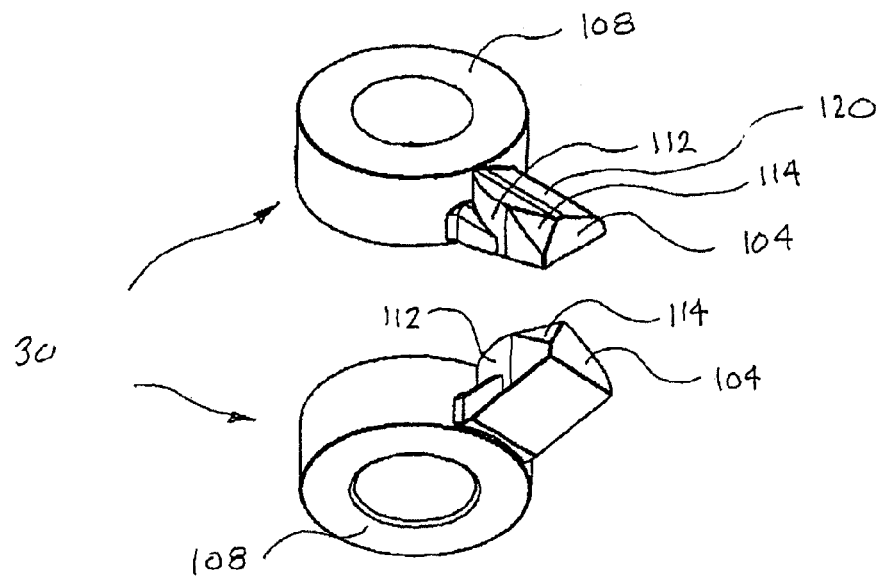
FIG. 32 shows perspective views of a preventer element of the castor wheel assembly of the sixth embodiment.
Figure 33:
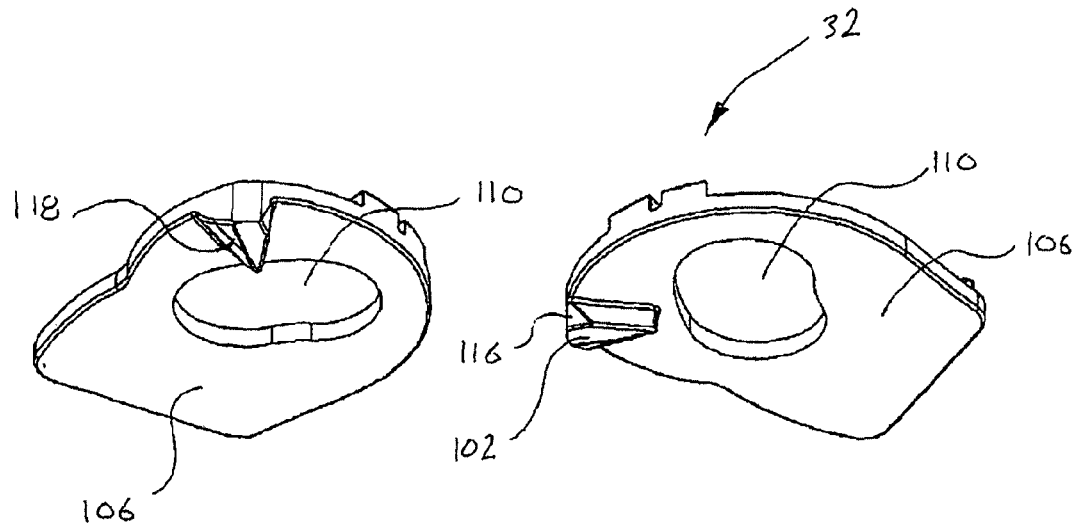
FIG. 33 shows perspective views of a stopping element of the castor wheel assembly of the sixth embodiment.
Figure 34:
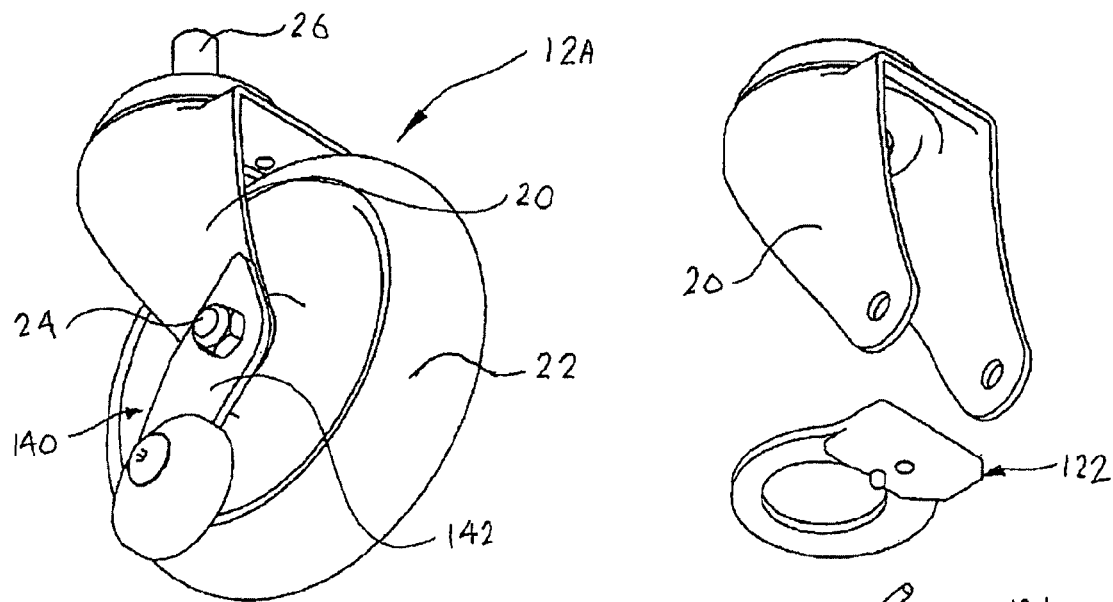
FIG. 34 is a perspective view of a seventh embodiment of a castor wheel assembly according to the invention.
Figure 35:
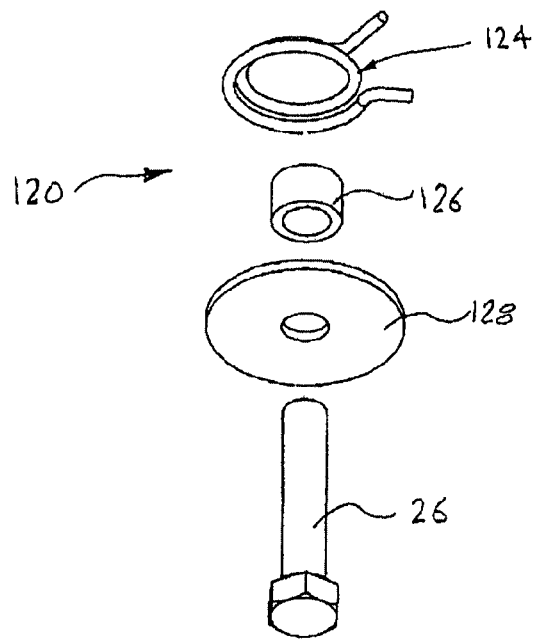
FIG. 35 is an exploded view of key components of the castor wheel assembly of the seventh embodiment.
Figure 36:
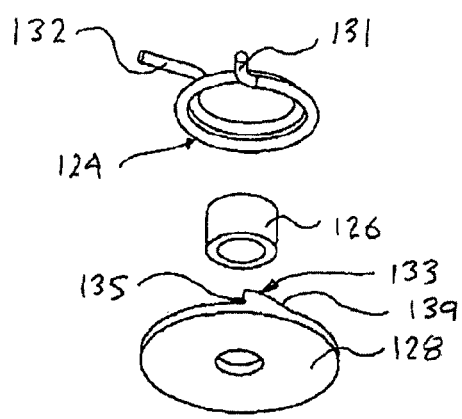
FIG. 36 is an exploded view of key components of the castor wheel assembly of the seventh embodiment.
Figure 37:
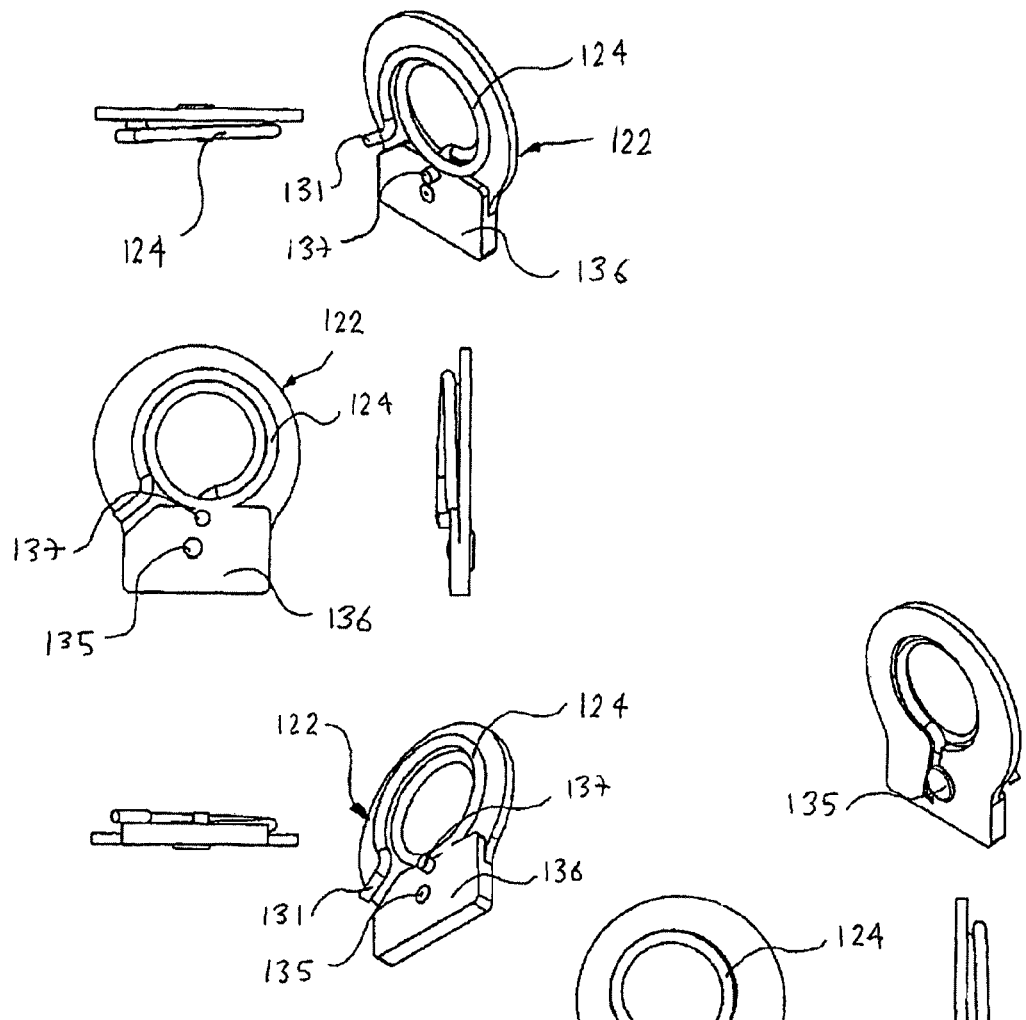
FIG. 37 shows various views of key components of the castor wheel assembly of the seventh embodiment.
Figure 38:
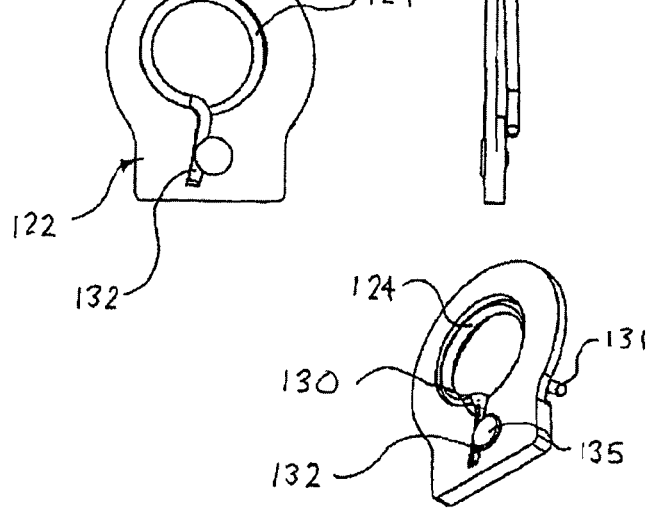
FIG. 38 shows various views of key components of the castor wheel assembly of the seventh embodiment.
Figures 39, 40:
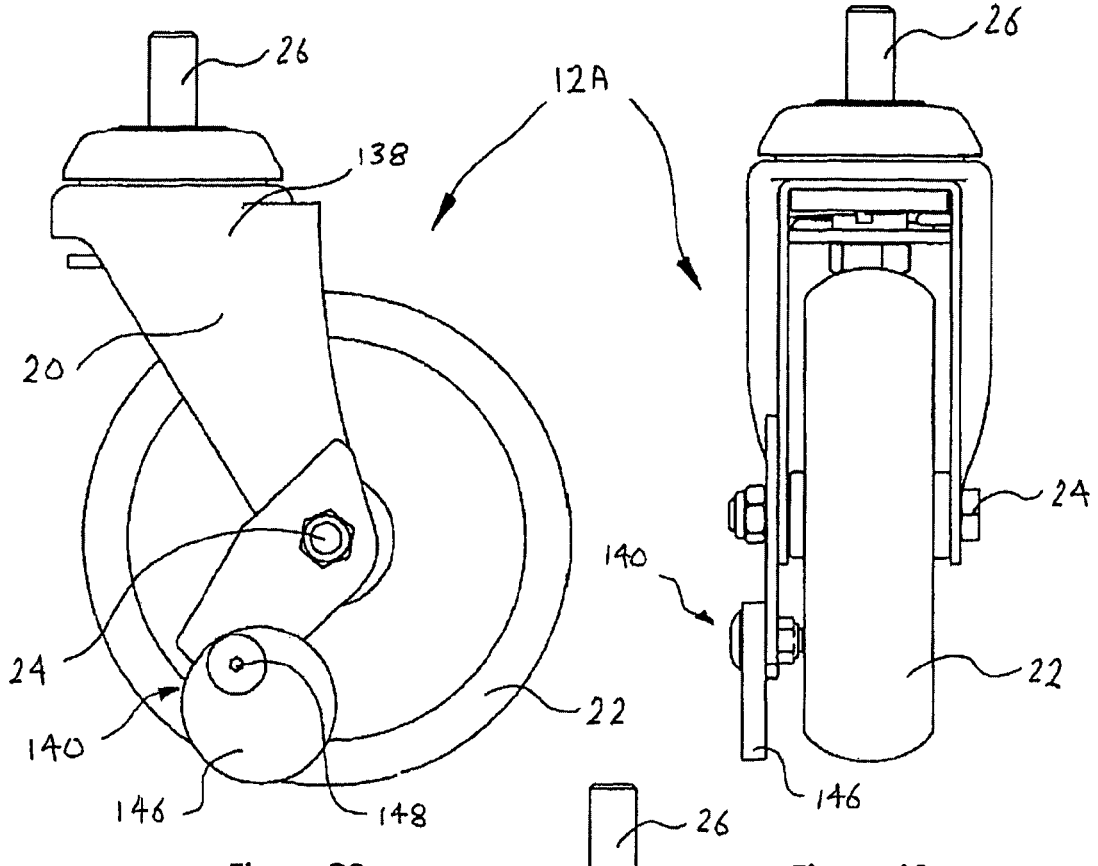
FIG. 39 shows a side view of the castor wheel assembly of the seventh embodiment.
FIG. 40 shows a rear view of the castor wheel assembly of the seventh embodiment.
Figure 41:
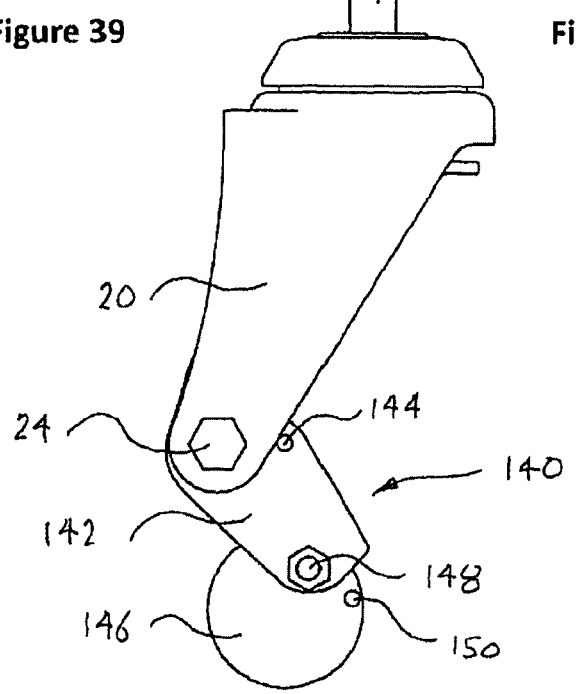
FIG. 41 shows a side view of key components of the castor wheel assembly of the seventh embodiment.
Figure 42:
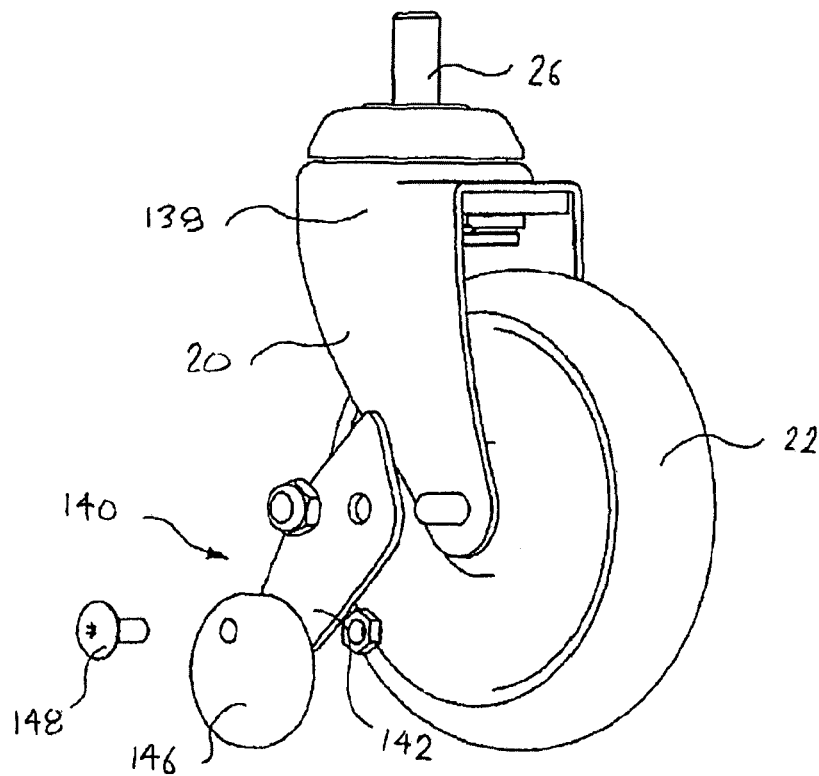
FIG. 42 is an exploded view of key components of the castor wheel assembly of the seventh embodiment.
Figure 43:
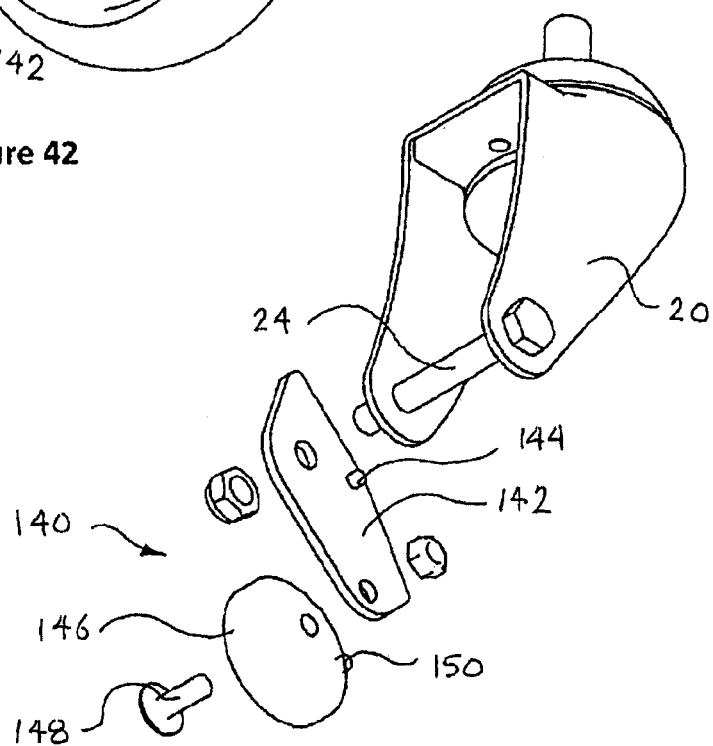
FIG. 43 is an exploded view of key components of the castor wheel assembly of the seventh embodiment.
Figure 48:
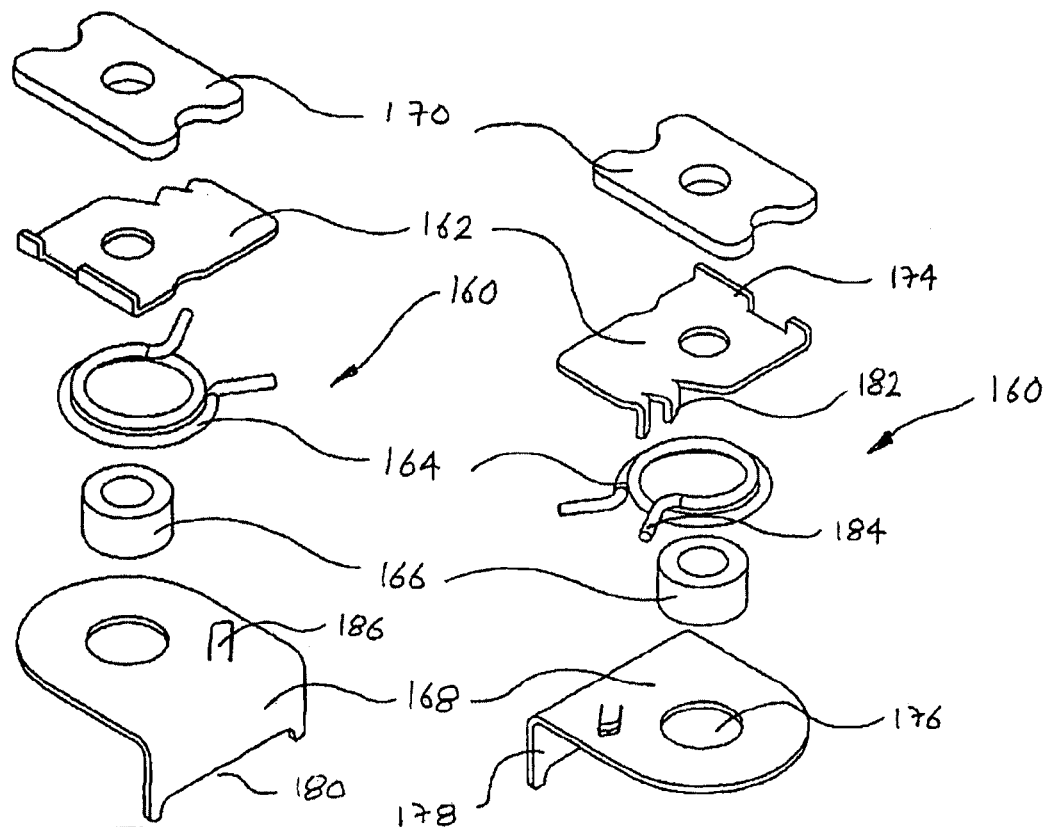
FIG. 48 is an exploded view of key components of the castor wheel assembly of the eighth embodiment.
Figure 47:
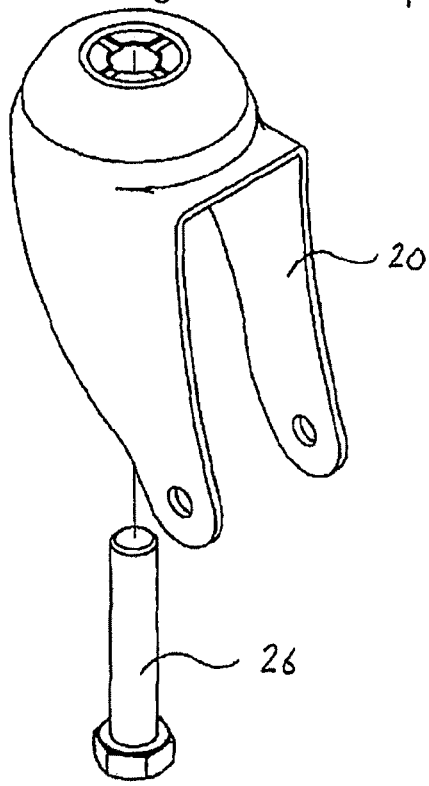
FIG. 47 is an exploded view of key components of the castor wheel assembly of the eighth embodiment.
Figure 49:
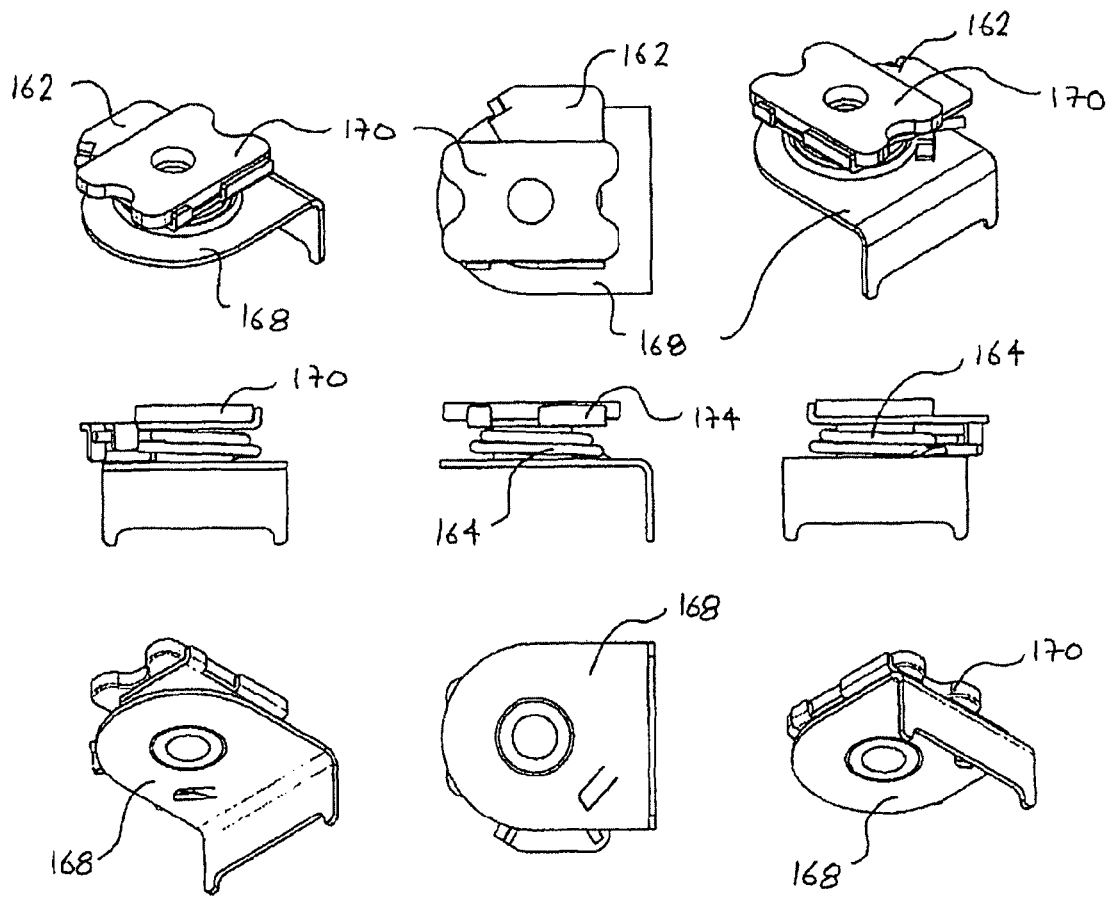
FIG. 49 shows various views of key components of the castor wheel assembly of the eighth embodiment.
Figure 50:
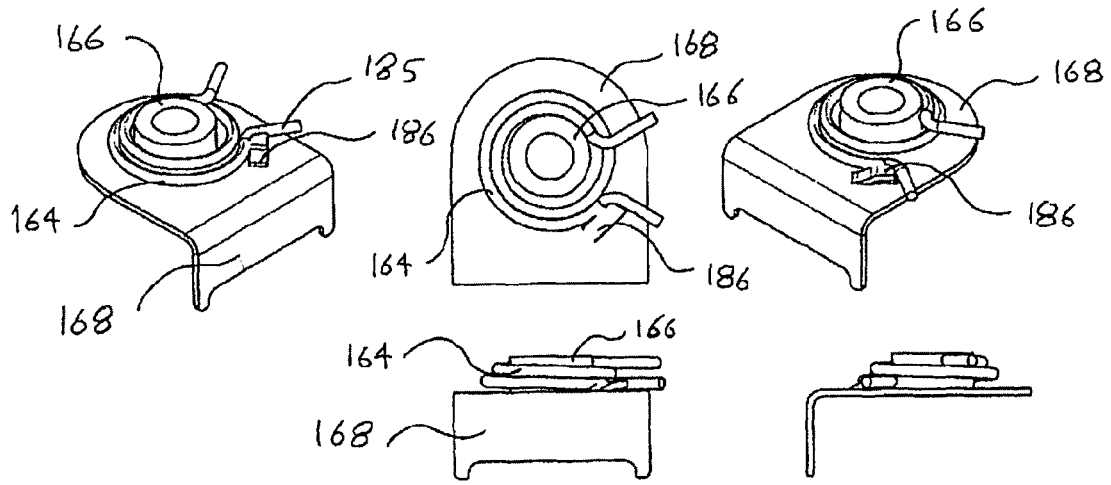
FIG. 50 shows various views of key components of the castor wheel assembly of the eighth embodiment.

FIGS. 32 and 33 show close up and detailed views of the preventer element 30 and the stopping element 32 respectively. The stopping element 32 oscillates about 20° and drives the preventer element 30 to rotate about 50°. This means that with a castor offset of 35° plus an extra margin for unlocking (over-riding) the swivel limiting means can readily fit into the available 50°. This occurs because the preventer element 30 does not share a common pivot with the stopping element 32. The preventer element 30 rotates on the swivel shaft 26 whereas the stopping element 32 pivots on the wheel bracket 20 as shown in FIG. 30. As the lug 104 of the preventer element 30 engages the lug 102 of the stopping element 32 the angle of attack between the two lugs 102 and 104 varies considerably throughout the range of engagement. When initial engagement is made between both lugs 102 and 104, the point of contact is on a radially inward end of the lugs 102 and 104, and as rotation progresses the point of contact rolls toward a radially outward end of the lugs 102 and 104. As seen in FIG. 32 a curved contact face 112 is provided on the lug 104 of the preventer element 30 for this purpose.

In this sixth embodiment release means or a release mechanism is provided at the end of the limiting means range of operation at or approaching the offset angle. When sufficient pressure is applied to the castor wheel bracket 20, the lugs 102 and 104 release engagement and allow the wheel bracket 20 to rotate freely past and beyond the offset angle or range required for the limiting means. This release mechanism is achieved by the provision of backward tapered surfaces such as 114 at radially outward ends of both lugs such as 104. The backward tapered surfaces 114 and 116 on both the preventer element and stopping element 30 and 32 respectively, make mutual contact wherein the stopping element 32 lifts and rises against the spring 100 pressure allowing it to ride over the lug 104 of the preventer element 30. In the reverse rotational direction, in this case clockwise, a sloping rear surface 118 of the lug 102 of the stopping element 32 slides across another sloping rear surface 120 of the lug 104 of the preventer element 30. The stopping element 32 rises upward against the spring 100 force to allow this sliding action in the clockwise direction.

The design of this sixth embodiment maximises the efficient use of limited space within the wheel bracket 20. In this example this is achieved by having the stopping element 32 oscillate around a pivot which is created by a shoulder such as 122 of the frame 20 as shown in FIG. 30. This eliminates the need for providing another component to create a pivot which occupies additional space within the wheel bracket 20. In this embodiment the relative size of key operational components such as the engagement lugs 102 and 104 and the spring 100 are larger than for example the earlier embodiments of the invention.

The castor wheel assembly of the preceding embodiments may include release means for automatic disengagement of the swivel limiting means on reversing of the trolley. For example the unlock swivel features of the applicant's granted Australian Patent No. 2005237657 may be incorporated in the castor wheel assembly. By reversing the trolley so that the castor wheel rotates in reverse as compared with its normal forward rotation, the limiting means would automatically disengage which in turn allows the castor to pivot freely past the normal offset angle. This allows unrestricted castor swivel on the reversing trolley so that the limiting means does not adversely affect the reversing of the trolley.

The release means may include a spring loaded breakout which is set at a greater torque setting than the torque required to maintain the appropriate offset angle required in normal forward travel. The spring loaded breakout may be activated by pushing the side of the trolley thus pushing it sideways with sufficient force, or pulling back on the trolley with sufficient force as to cause the offset castor which is abutting the limiting means to spring past the limiting means. This action will enable the limiting means to disengage and allow the castor to pivot freely past the normal offset angle, and therefore allow unrestricted castor swivel in the sideways moving, or reversing trolley so that the limiting means does not adversely affect the sideways movement, or reversing of the trolley. Besides aiding in allowing more freedom in sideways movement, or reversing of the trolley, the spring loaded breakout can be useful in protecting the castor and castor mechanism from abuse which may be intended or accidental. As the spring loaded mechanism releases at a certain load, the castor becomes free to swivel and thus an increased and potentially damaging load cannot be placed on the trolley, trolley components, castor, and castor components which would otherwise be the case if the castor remained rigidly locked so as not to swivel past the swivel limiting means.

FIGS. 34 to 43 illustrate a seventh embodiment of the castor wheel assembly 12A which includes two sub-assemblies. The first sub-assembly is the steering assembly 120 housed within the wheel bracket or castor frame 20. The second sub-assembly is the reversing brake assembly 140 bolted to the axle bolt 24 of the wheel 22. The brake assembly 140 is to facilitate unimpeded reversing of the trolley 10.

The steering assembly 120 comprises swivel limiting means in the form of a stopping element 122 and a torsion spring 124 together arranged to operatively engage a preventer element 128. A swivel shaft or bolt 26 secures the preventer element 128 and the spacer 126 to an inner race of the swivel bearing (not shown) of the castor 12A, thus rigidly fixing these components to the castor frame 20. The preventer element 128 remains rigidly oriented to the direction of the trolley 10.

The spring 124 is cradled and securely held in position in the stopping element component 122. A recessed groove 130 in the stopping element 122 is provided to take a fixed leg 132 of the spring 124 (see FIG. 38). A rivet 135 is inserted through the stopping element 122 to secure the leg 132 of the spring 124. The stopping element 122 and spring 124 assembly is secured within the castor frame 20 by a squared extension 136 of the stopping element 122 (see FIG. 37) which extends rearward between opposing flanges such as 138 of the castor frame 20. Thus the stopping element 122 and spring 124 assembly rotates with the castor frame 20 and remains oriented to the direction of the castor wheel 22.

The stopping element 122 and spring 124 assembly has room for a limited up and down movement, and floats within the castor frame 20, so that it rests gently on the preventer element 128. Gravity encourages it to drop so that an engagement end 131 of the spring 124 interacts with a lug 133 of the preventer element 128 (see FIG. 36). A square end 135 of the lug 133 engages the spring 124 in one direction of travel, activating the spring 124. A 'limit of travel' stop 137 (see FIG. 37) is incorporated into the stopping element 122 to limit the spring 124 movement, and thus limit the rotation of the castor 12A to approximately 35 degrees in the engaged direction. For free rotation of the castor swivel 12A in the opposite direction, a tapered end 139 of the lug 133 of the preventer element 128 allows the stopping element 122 and the spring 124 assembly to ride over the lug 133 without engaging it. Thus in this direction, the castor 12A has full unrestricted rotation.

During activation, the torsion spring 124 engages at about the normal straight ahead position of the castor 12A. The spring 124 is able to travel throughout about 35 degrees of rotation under increasing pressure. Thus the torsion spring 124 provides a light tension from about 0° which reduces the wheel 22 wobble and provides a smooth steering action. The spring 124 tension increases substantially through about 25° to 35° thus providing a variable limiting means throughout this range. In the opposite direction of rotation, there is no restriction to the swivelling of the castor 12A.

The brake sub-assembly 140 is provided to facilitate unimpeded reversing of the trolley 10. As the trolley 10 is reversed, one or both of the rear castors 12A or 12B may swivel and engage the spring 124, and under these circumstances the spring 124 will orient the castor 12A or 12B to travel in a direction which is not directly backwards so as to steer the trolley 10 inappropriately. The brake sub-assembly 140 engages in reverse travel and its action causes the castor such as 12A to swivel away from spring 124 engagement so that the castor 12A swivels in the unrestricted direction of rotation.

One brake assembly such as 140 is fitted to a castor 12A. The left hand rear castor 12A has the brake assembly 140 fitted to its left hand side, and the right hand rear castor 12B has it fitted to the right hand side. The brake assembly 140 comprises a bracket 142 which is bolted rigidly to the axle bolt 24 of the castor wheel 22. A locater stop 144 (see FIG. 41)

on the brake bracket 142 positions the bracket 142 correctly in place, and prevents any unwanted movement of the bracket 142 to move from its correct location when under load. The locator stop 144 contacts a forward edge of the castor frame 20.

A rotational brake pad or disc 146 typically of rigid plastic such as nylon is attached to the brake bracket 142 on a bolt or pin 148. The brake disc 146 is able to rotate freely. In forward travel of the castor such as 12A, the brake disc 146 drags behind its rotational mounting pin 148, and rides gently over the floor surface. When the trolley 10 and the castor 12A are reversed, the eccentrically mounted brake disc or pad 146 becomes wedged between the mounting pin 148 and the floor. The brake disc 146 thus rotates so that a rotational stop 150 on the brake disc 146 (see FIG. 41) contacts and abuts the brake bracket 142, at which point the brake sub-assembly 140 is fully activated. As the brake assembly 140 is mounted in a position offset to the side of the castor 12A, activation readily causes the castor 12A to swivel in the direction towards the brake 140. Thus the left hand rear castor 12A will swivel to the left, in the clockwise direction, and the right hand read castor 12B will swivel to the right in the anticlockwise direction. As both castors 12A and 12B swivel freely and unimpeded in these directions, the trolley 10 is easily reversed.

FIGS. 44 to 51 illustrate an eighth embodiment of the castor wheel assembly 12A which also includes two assemblies. The first sub-assembly is the steering assembly 160 mounted between the wheel bracket 20 or the castor frame and the trolley frame 14. The second sub-assembly is the reversing brake assembly 140 bolted to the axle bolt 24 of the wheel 22. The brake assembly 140 is to facilitate unimpeded reversing of the trolley 10. The brake assembly 140 has already been described in detail in the seventh embodiment and the same reference numerals are used in this instance.

In the eighth embodiment, the steering assembly 160 is located between the castor frame (wheel bracket) 20 and the trolley frame 14. The steering assembly 160 comprises swivel limiting means in the form of the stopping element 162, torsion spring 164, and spacer 166 together arranged to operatively engage a preventer element 168. Also illustrated is a somewhat rectangular washer 170 fitted between the trolley frame 14 and the castor frame 20. The swivel bolt 26 passes through the wheel bracket 20, the preventer element 168, the spacer 166, the torsion spring 164, the stopping element 162, the washer 170, and the trolley frame 14 (not shown). Of these components, the swivel bolt 26 rigidly secures the inner race of the swivel bearing (not shown) of the castor, the spacer 166, the stopping element 162, and the washer 170 to the trolley frame 14. Thus these components remain aligned to the orientation of the trolley 10. Loosely fitted to the swivel bolt 26 are the preventer element 168 and the torsion spring 164 which are thus able to rotate or otherwise move relative to the bolt 26.

The stopping element 162 has two upward pointing lugs 174 which correctly align it to the orientation of the washer/trolley 170/10, and then it is rigidly secured by the swivel bolt 26 when tightened. This alignment is clearly shown in FIG. 49. The preventer element 168 has a hole 176 through which the spacer 166 fits loosely. The preventer element 168 is thus able to rotate freely around the spacer 166. The preventer element 168 sits above the wheel bracket 20 and is aligned to the wheel bracket 20 by means of a broad downwardly pointing lug 178 having a recess 180 which straddles the square rear section of the wheel bracket 20. Thus the preventer element 168 rotates with the castor frame 20 and remains oriented to the direction of the wheel bracket 20.

Figure 51:
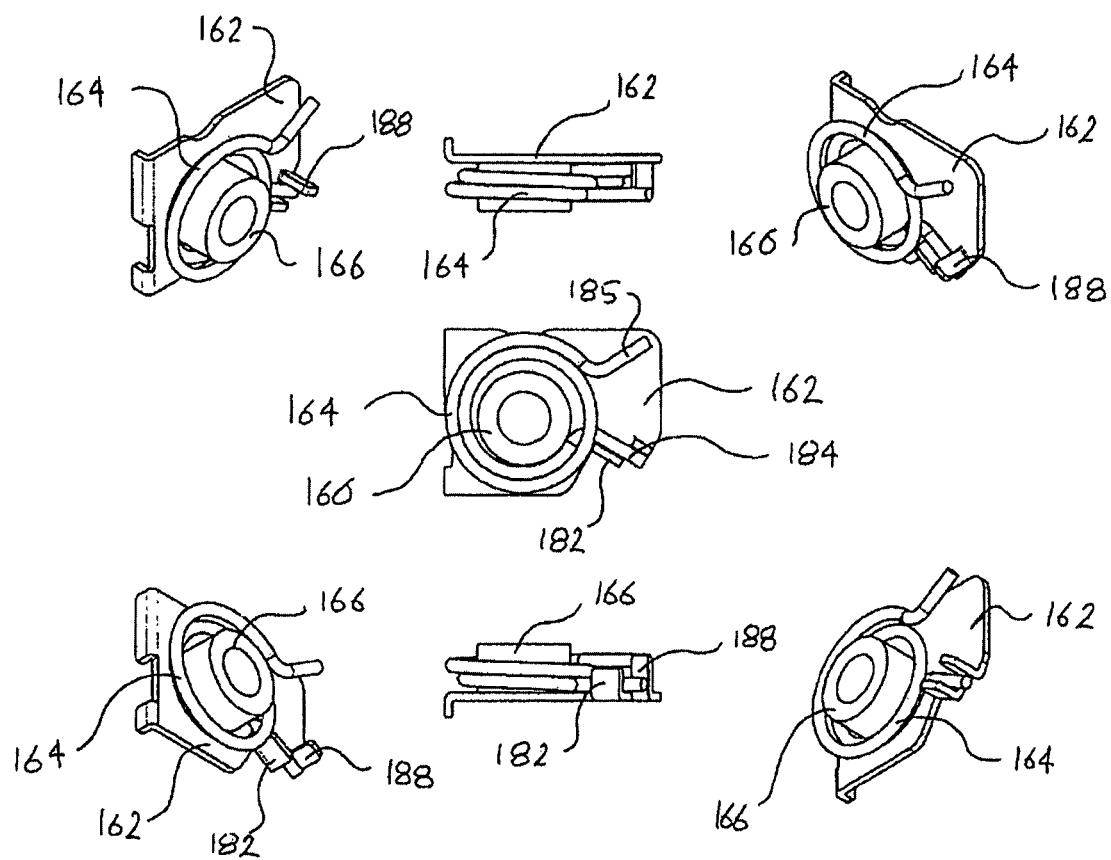
FIG. 51 shows various views of key components of the castor wheel assembly of the eighth embodiment.

The torsion spring 164 is mounted between the stopping element 162 and the preventer element 168. The spring 164 is loosely secured to the stopping element 162. Two downwardly pointing tabs 182 on the stopping element 162 keep the fixed leg 184 of the spring 164 loosely in position. This can be seen in FIG. 51 where these tabs 182 are clearly visible. The spacer 166 also assists to correctly locate and position the spring 164. The torsion spring 164 is mounted so that it is slightly offset to the spacer 166. In FIG. 51, in the middle graphic, it is seen that the spring 164 and the spacer 166 come into close contact between the four o'clock and six o'clock positions. This area of contact plus the positioning of the two tabs 182 previously described ensure that the spring 164 remains in correct position.

The torsion spring 164 has room for a limited up and down movement, and floats between the stopping element 162 and the preventer element 168, so that it rests gently on the preventer element 168. Gravity encourages it to drop so that an engagement end 185 of the spring 164 interacts with a lug 186 of the preventer element 168 (see FIG. 50).

The square end of the preventer element 168 lug 186 engages the spring 164 in one direction of travel, activating the spring 164. A 'limit of travel' stop 188 (see FIG. 51, lower middle graphic) is incorporated into the stopping element 162 to limit spring 164 movement, and thus limit the rotation of the castor frame 20 to approximately 35 degrees in the engaged direction. In this embodiment, the 'limit of travel' stop 188 is the outer of the two tabs 182 of the stopping element 162 which secure the fixed leg 184 of the spring 164 in position. The said outer tab or stop 188 is marginally longer than the other and extends sufficiently to stop the movable leg or engagement end 185 of the spring 164 passing it. The said outer tab or stop 188 being the longer of the two, is positioned outside the rotational path of the lug 186 of the preventer element 168 so as not to interfere with its rotation when it rotates in the non-engaging direction.

For free rotation of the castor swivel 12A in the opposite direction, the tapered end (see FIG. 50) of the lug 186 of the preventer element 168 allows the spring 164 to ride over the lug 186 without engaging it. Thus in this direction, the castor has full unrestricted rotation. During activation, the spring 164 engages at about the normal straight ahead position of the castor frame 20. The spring 164 is able to travel throughout about 35 degrees of rotation under increasing pressure. Thus the torsion spring 164 provides a light tension from about 0° which reduces wheel wobble and provides a smooth steering action. The spring 164 tension increases substantially through about 25° to 35° thus providing a variable limiting means throughout this range. In the opposite direction of rotation, there is no restriction to the swivelling of the castor 12A.

In a variation on the eighth embodiment the steering assembly 160 may be simplified to fewer components. For example, the stopping element, washer and spacer may be fabricated as a one-piece component. The one-piece component and the torsion spring may together comprise the swivel limiting means. In this variation the preventer element may be incorporated in the wheel bracket or castor frame in the form of a lug which is engaged by the swivel limiting means.

The castor wheel assemblies 12A of the preceding embodiments are generally fitted to a trolley with normal swivelling castors at the front. The castor wheel assemblies 12A each having offset swivel limiting means are fitted at the rear of the trolley. This configuration causes the trolley to mimic the turning and steering characteristics found in trolleys having a mid-mounted guidance wheel. The trolley is turned by swinging the handrail from side to side, just as you would steer the trolley if it had a mid-mounted guidance wheel. With a sideways movement of the handrail, the trolley is swung to point in the direction the trolley is intended to go; swung to the left, the trolley will turn to the right, etc.

The swivel limiting means as shown in FIGS. 3 and 4 limits the amount of swivel on the rear castor on the side of the trolley which is on the outside of the turn. Therefore, on a trolley such as 10 being turned to the right, the swivel of the left hand rear castor 12A is limited and allowed only to swivel to a certain point which is located between the castor's normal straight ahead position and a 90° angle to the straight ahead position. On a trolley 10 being turned to the right, the handrail 13 is swung to the left, which action causes the left hand castor 12A to swivel anticlockwise, and swivel inwards towards the longitudinal centreline of the trolley 10. On a supermarket trolley such as 10 of about 160 liter capacity, the preferred offset swivel angle for maximum leverage is about 35° from the castors straight ahead position. Once the swivel limiting means has impeded the castor's swivel, continuing to hold the handrail 13 to the left will cause the castor such as 12A to act as a guidance wheel, and cause the trolley 10 to gently turn to the right. Applying increased pressure on the handrail 13 towards the left will propel the rear left hand castor 12A, and the left side of the trolley 10 forward, causing the trolley 10 to rotate clockwise, and with increasing pressure the trolley 10 will rotate the more sharply.

With the trolley 10 at a standstill, moving the handrail 13 to the left only causes the left castor such as 12A to abut the swivel limiting means within about 30 millimeters of movement. Holding this position, the swivel limiting means restrains the left castor 12A and causes it to act as a guidance wheel, and the trolley 10 will perform a gentle controlled turn to the right. Proceeding to move the handrail 13 further to the left will propel the left side of the trolley 10 forward, causing the trolley 10 to rotate more sharply in a clockwise direction, and the further the handrail 13 is moved left the sharper the trolley 10 will turn. Combining the movement of the handrail 13 to the left, with a forward or reversing movement on the right hand side of the handrail 13 will cause the location of the virtual central pivot point such as 15 around which the trolley 10 is rotating to vary. Thus the trolley 10 can be turned gently, or sharply turned on the spot. In general forward travel, proportionally increasing the movement of the handrail 13 towards the left, in relationship to the forward movement, will create an increasingly sharper turn.

If the trolley 10 is controlled using just one hand, the ideal location to hold the handrail 13 is the end opposite the castor 12A or 12B where the swivel limiting means is active. Thus on a trolley 10 being turned to the right with a single hand, grasp the handrail 13 at its right hand end which is closest to the inside of the turn. From this single position, the trolley 10 can be accurately controlled and steered. From this one position on the handrail 13, the amount of hand movement to the left combined with any forward/reverse movement will accurately steer the trolley 10. The rear, right hand castor 12B is free to swivel unhindered when going into a right hand turn, and because it is situated almost directly below the hand position it will swivel easily and essentially mimic the movement of the hand. If the hand is moved forward, the castor 12B will travel forward; if left, the castor 12B will travel left; if moved backwards, the castor 12B will travel backwards. Because of the close proximity of the right hand castor 12B to the right hand end of the handrail 13, total control of this castor 12B is achieved with extremely little effort. Controlling the left hand castor 12A from this single handed position (when turning right) involves a different process, but it also is achieved with extremely little effort. Moving the handrail 13 to the left causes the left hand castor 12A to swivel anticlockwise until it engages the swivel limiting means, and with continued pressure to the left, the left hand castor 12A remains fixed in its orientation relative to the trolley 10 at an offset angle, and acts as a guidance wheel.

The castor wheel assembly 12A or 12B in acting as a guidance wheel becomes a fulcrum around which the operator can pivot the trolley 10. Because of the ample distance, measured horizontally, between the guidance wheel 12A on the left, and the right hand end of the handrail 13, this ample distance gives a very respectable length to fulcrum, thus making the turning of the trolley 10 an easy and pleasant experience. The length to fulcrum equates favourable with the length to fulcrum that would be expected on a trolley of similar size that was fitted with a mid-point guidance wheel. The longer the length to fulcrum, the more leverage is produced and therefore less effort is required. There are profound similarities between the operation of this trolley such as 10 and one having a fixed mid-point guidance wheel. Both are guided and steered by left/right movement of the handrail, thus facing them in the direction they are intended to travel. Both utilize a fulcrum point to enable easy and accurate steering. The trolley 10 of an embodiment of the present invention can generate a substantial rotational thrust at its front end when side pressure is applied to the handrail 13, which gives an indication of the power of the positive forces generated to control and manoeuvre the trolley 10. With increasing pressure to the left, there is a point at which the left castor 12A is thrust forward causing the trolley 10 to rotate sharply clockwise, and causing the trolley's 10 front castors 16A and 16B to turn to face towards the right and travel in this direction. This is the action which enables the significantly sharp turns of which this trolley 10 is capable.

The thrust that can be generated at the front castors 16A and 16B when a rotational side pressure is applied to the handrail 13 is substantial. In tests it has been measured and calculated that about 60 to 66 percent of the force applied at the handrail 13 is transferred to a sideways force in the vicinity of the front castors 16A and 16B. This creates a substantial aid in turning the trolley 10. These tests were performed on a supermarket trolley of about 160 liters capacity. The force was applied to the left hand end of the handrail 13 so as to turn the trolley 10 by rotating the trolley 10 in an anticlockwise direction, the right hand rear castor 12B was limited at an offset of 35° by the swivel limiting means. This castor 12B provided the fulcrum, and the wheel 22 of this castor 12B was not restricted from moving forward during the tests neither was its rotation restricted in any way, and none of the wheels on the trolley were restricted from rotating, and the generated force was measured in the vicinity of the front castors 16A and 16B. The length to fulcrum was measured to be approximately 500 millimeters and the distance between the fulcrum and the front castors 16A and 16B measured about 650 millimeters. The tests were carried out with progressively increasing force, and the applied force was progressively increased to 6 kilograms. Throughout all tests, the results showed consistently that the equivalent of approximately two thirds of the applied force was recorded as a sideways force in the vicinity of the front castors 16A and 16B. These tests indicate that the offset limited castor 12A and 12B does enable the efficient transfer of forces from the rear handrail 13 to the front castors 16A and 16B, which in turn, helps to provide easy control and turning of the trolley 10, and also the relatively easy control of the trolley 10 travelling across slopes.

Operation of the trolley such as 10 with just one hand has been described, in part, so a more accurate description of the forces involved can be understood. A person using the trolley 10 with two hands will get the same benefit because of the length to fulcrum. It is not necessary for the operator to know how or why it works and it is sufficient that the trolley 10 just becomes easier to manoeuvre. To control and steer the trolley 10, the handrail 13 has merely to be moved from side to side to point the trolley 10 in the desired direction.

With a supermarket trolley of about 160 liter capacity, the preferred offset swivel angle for maximum leverage is about 35° from the castors 12A or 12B straight ahead position. The preferred offset angle will vary according to trolley specifications, including such things as the weight of trolley and load, the length of the trolley, and the length to fulcrum. The lighter the trolley the less angle is required. On a supermarket trolley of about 160 liter capacity, a 35° offset is appropriate when it is well loaded, but the same trolley when empty requires only about a 25° offset to be comfortably controlled. A spring loading through the 25°-35° range can provide a heightened operators experience. An appropriate spring loading through the 25°-35° range can range from minimal to zero point nine (0.9) foot-pounds (1.2 Newton meters) at 25°, increasing to about one to one point three (1-1.3) foot-pound (1.3 to 1.7 Newton meters) loading at 35°. So throughout the 25° to 35° range, the spring loading may for example be set at minimal at 25° increasing to 1 foot-pound (1.3 Newton meters) at 35°; or throughout the same range the loading may be set at 0.9 foot-pound (1.2 Newton meters) at 25° increasing to 1.3 foot-pounds (1.7 Newton meters) at 35°.

The narrower offset angles provide a more sensitive steering of the trolley with a quicker turning response. The narrower offset angles also mean that the trolley handrail will swing out less on cornering. It is not so much an issue that the handrail will swing out wide and collide with whatever is adjacent; even at 35° the handrail doesn't tend to swing out wide at all. It has more to do with a comfortable operator's experience. Swinging the handrail wide when there's no apparent load in the effort seems unwieldy, when more sensitive steering can be easily provided. But when the trolley is loaded, the wider offset angle makes for easier steering and is greatly appreciated by the operator. On longer trolleys where there is also a greater distance from the handrail to the front castors, the offset angle is generally increased. For instance, on a trolley bed the offset angle may comfortably be around 45°. In situations where the handle extends considerably rearward of the rear castors in items such as a pram or pusher, the offset angle can be reduced, and may be in the range of 15° to 20°.

Ease of steering and consistent positive control of the trolley such as 10 is understood to be achieved because the rear swivelling castors 12A or 12B are easily controlled as they are located adjacent the rear-placed handrail 13. When the handrail 13 is pushed forward, the rear castors 12A and 12B will face directly ahead. When the handrail 13 is pushed to the left both rear castors 12A and 12B will swing to face and travel to the left. This action may be repeated to the right and the castors 12A and 12B will travel to the right. Each time these actions are repeated, they provide equally positive and consistent results. Thus such steering control is consistently easy and positive. Added to this easy control of the rear-end, is the ability to also easily control the front-end castors 16A and 16B of the trolley 10 through the fulcrum provided by the rear castors 12A and 12B being limited at an appropriate offset angle with sufficient force, and also having the appropriate leverage, and length to fulcrum, provided by the handrail 13.

Except for crab steer, all other control and turning of the trolley 10 can be achieved by a simple side to side motion of the handrail 13. This action effortlessly controls the rear castors 12A and 12B, and through the limiting means described the front castors 16A and 16B are secondarily controlled, whereby the front castors 16A and 16B are maintained steady in their position or encouraged to turn left or right, depending on aspects such as the aggressiveness of the turn, and the weight of the trolley 10 and load. It is only to achieve crab steering where all castors turn to face the same general offset direction and allow the trolley 10 to move bodily towards one side that the operator need directly control the front castors 16A and 16B by manipulating the trolley 10 by thrusting it around the pivot of his own body causing the entire trolley 10 to be thrust sideways, and this is an action that need only be performed on rare occasions when the trolley 10 is in a confined situation such as hard against a wall or other restricting barrier The quadrant in which the swivel limiting means operates is defined as a quarter of the 360° swivelling path of the castor. The quadrant occupies the section from where the castor faces directly straight ahead through 90° in an anticlockwise direction for the left hand castor such as 12A, and the section from where the castor faces directly straight ahead through 90° in an clockwise direction for the right hand castor such as 12B. As the castor swivels through the quadrant there are angles which are too small for the limiting means to have the desired effect, and there are angles which are too wide for the limiting means to have the desired effect. Using the left hand castor 12A as the reference, if the castor 12A is fixed so that the castor 12A faces directly straight ahead, and the handrail is perpendicular to the line of travel of the castor 12A, and a side pressure is applied towards the left on the handrail 13, there occurs no reaction on the castor 12A to propel the left side of the trolley 10 forward and cause a clockwise movement of the trolley 10. This situation remains the same, and does not change notably throughout a limited range as the castor swivel is realigned so that the angle of offset increases within the quadrant, and the castor 12A is fixed so that it faces at a slight offset angle to the straight ahead position. Therefore placing the limiting means in this range will not produce the desired effect.

At a point within the quadrant where the degree of offset of the castor such as 12A is sufficient, the situation changes significantly. At this point the castor's limiting means enables a side pressure applied towards the left on the handrail 13 to propel the left side of the trolley 10 forward and cause a clockwise movement of the trolley 10. The limiting means may lock, or otherwise suitably restrict the castor 12A to remain at the appropriate angle, or within the limited range to accomplish this action. Within the quadrant there is found a limited range of offset angle which is appropriate to each particular trolley having a particular load. With a supermarket trolley of about 160 liter capacity, there is a preferred offset angle for an empty trolley, and another preferred offset angle for a fully laden trolley. The limiting means on a given trolley may incorporate a restraining means which is spring loaded to allow a matching of the offset angle to the overall weight of the trolley. This is readily accomplished as the lighter trolley will respond earlier at the lesser degree of offset, and the loaded, heavier trolley with more resistance to turning will only respond when the offset angle reaches the greater offset. Towards the other end of the quadrant, the offset angles become too great to be of any benefit in transferring the side to side movement of the handrail 13 into an action that will either stabilize or propel the front castors 16a and 16b to the left or right. At these larger offset angles, pushing the handrail 13 of the trolley 10 to the left merely makes the rear of the trolley 10 move left and the action exerts no influence or control over the front castors 16A and 16B, and the trolley essentially behaves as would a trolley that is equipped with four fully swivelling castors. Thus there is a limited range within the quadrant that will suitably accomplish a degree of control of the front castors to aid in easy control and steering of a given trolley. Within the said limited range, there is an even more limited preferred range that will accomplish a more perfect degree of control.

Provided below is a formula which can be used to calculate the approximate optimal angle at which the castor wheel assembly such as 12A or 12B should be limited so as to give the maximum leverage. The supermarket trolley used in the example has a rear 'Wheel Track' (WT) of 500 mm, and a 'Wheel Base' (WB) of 650 mm.

$$\arctan(2*WB/WT)/2.$$

Calculating using the values of the above example: arc tan (2*650/500)/2=34.5°. Therefore the optimal angle at which the castor should be limited so as to give the maximum leverage is approximately 35°.

When the left hand rear castor 12A is swivelled anticlockwise from its straight ahead position by approximately 70°, the direction of travel of the left hand castor 12A is perpendicular to a point midway between the two front castors 16A and 16B of the trolley 10. If the castor 12A is restrained at this 70° angle, and taking into account the frictional restraints created by the front castors 16A and 16B, the said castor 12A will have a tendency to travel in a circle, the centre of which will have a propensity to be located midway between the two front castors 16A and 16B, and the said castor 12A will have a tendency to describe a circle around this point. At this 70° angle, the left hand rear castor 12A does not have the ability to affect the front castors 16A and 16B to drive them to the right, and thus aid in turning, so there is nothing to be gained by placing a limiting means at this 70° position.

The position of the limiting means which will achieve the maximum thrust to turn the front castors of the trolley 10 is located generally halfway between the castor's straight ahead position (0°) and the 70° position, therefore giving 35°. This angle can be calculated using the formula above, and it identifies the general position to which the castor 12A or 12B should be limited to achieve its maximum thrust to turn the front of the trolley 10. This of course relates to a trolley having the given dimensions. Therefore the maximum thrust for this trolley 10 is achieved at a castor angle of about 35°. The range wherein the castor 12A or 12B can achieve appropriate operation lies only and exclusively between 0° and 70° and nowhere else in the 360° swivel of the castor 12A or 12B, and within this range it diminishes dramatically at both ends, towards 0° and towards 70°. Also, in the region between approximately 35° and the 70°, the desired effect does diminish so as to be less effective than at the mid-range 35°. Nothing is to be gained by increasing the angle of the castor 12A or 12B substantially above approximately 35°. In the said 35° to 70° range as the angle increases, the trolley 10 steering becomes more unwieldy as the handrail 13 needs to be swung out wider to achieve similar results compared to the lesser angles, and simultaneously the desired effect on the front castors 16A and 16B diminish substantially making overall operation much less effective. This makes the useful range fall within zero and 35°.

Noting as stated earlier that within the 0° to 70° range its effect diminishes dramatically at both ends including the end towards 0°; it is considered that for a trolley of these dimensions, the effective range is generally limited to a 20° range approximately, from 15° to 35°. For a heavily laden trolley the desired range will be around 35°, and for a lightly loaded or empty trolley the desired range will be about 20° plus or minus some 5°. Therefore the useful range will fall generally within a 20° segment from about 15° to 35°. This segment comprises only a small proportion of the total 360° rotational swivel of the castor, this proportion being about 6 percent. Thus for a left hand rear castor fitted with a swivel limiting means, the relevant segment comprises only about 6 percent of the total swivel rotation when swivelled in an anticlockwise direction, and no swivel limiting means needs to be provided when the castor is swivelled in the opposite, clockwise direction as there is no need for a swivel limiting means in this direction of rotation.

In the preferred embodiments of the castor wheel assemblies there are three aspects utilized in controlling, and more specifically, in turning the trolley. The first aspect is when the rear castors are essentially facing forward, and travelling forward. A slight sideways movement of the handrail may be adequate to make slight corrections to the direction of travel. The castor may be aided in this function with the provision of other biasing means in the form of a light spring loading which gently biases the castor towards straight, and essentially takes the wobble out of the castor. It is desirable that a light bias be used in that area of swivel where the castor is close to the straight ahead position, because a heavy bias in this region tends to make the trolley uncomfortably heavy to steer, this being distinctly felt by the operator. The castor may be mounted to a trolley frame which is slightly angled so that the castor mounting point on the trolley is not perfectly horizontal but is slightly higher at the rear. This angle in turn affects the mounting angle of the castor and the angle of the swivel axis of the castor. The slightly back-swept swivel axis causes the castors to bias towards the straight ahead position in forward travel, and this reduces wobble of the castor. With level and smooth floor conditions, such biasing can provide a limited aid to the control of the trolley and may be of benefit in making slight directional changes.

The second of the three aspects of control achieved by the preferred embodiments, occurs when the castor swivels into gentle contact with the swivel limiting means. The offset angle of the rear castor on the outside of the turn, describes an arc which the trolley will take as it follows the guidance of this castor. At the same time, there is also a gentle pressure exerted on the front castors of the trolley by the operator through the pressure applied to the swivel limited castor, which restricts the front swivelling castors normal tendency to wander wide on the turn. Thus the trolley will turn in a gentle controlled curve, and very little effort is exerted by the operator to accomplish this.

The third aspect of control and steering achieved by the preferred embodiments, is when the handrail is pushed sideways with an increased effort, thus causing the trolley to turn more sharply. In this type of turn, the castor swivels into heavier contact with the swivel limiting means causing the offset castor on the outside of the turn to thrust forward, the leverage exerted by the operator on the handrail transfers through the swivel limited castor to swing the front swivelling castors of the trolley also into the turn. Thus the trolley is turned more sharply, yet because of the ample leverage generated by the relationship of the handrail of the trolley to the fulcrum point of the offset limited castor, this turn can be performed easily. The trolley through this means may even be turned so sharply so as to make a complete 'U' turn on the spot.

It will be understood that it is not necessary for the trolley's operator to understand the technical aspects of the forces or mechanics involved to be able to properly use the trolley. The operator only needs to know that a gentle sideways movement of the handrail produces a gentle turn which is both consistent and predictable. The more sharply the handrail is moved, the sharper the turn will be, and throughout all aspects of turning, the control of the trolley remains relatively easy, consistent and predictable.

Now that a preferred embodiment of the present invention has been described in some detail it will be apparent to those skilled in the art that the castor wheel assembly and the trolley have at least the following advantages:
- the castor wheel assembly provides for guided steering with effective manoeuvring of for example its associated trolley;
- the castor wheel assembly is relatively simple in construction with a reduced number of components;
- the castor wheel assembly can swivel up to a predetermined offset angle for guided steering in a forward direction and with release means can swivel beyond the offset angle for travel in a reverse direction;
- the castor wheel assembly can include limiting means having restricting means for a variable range of biasing up to and approaching the offset angle.

Those skilled in the art will appreciate that the invention described herein is susceptible to variations and modifications other than those specifically described.

For example, the castor wheel assembly need not include additional biasing such as that used to reduce wheel wobble. It need not necessarily include release means in which case it does not swivel beyond the offset angle. The swivel limiting means may include a magnetic limiting means, a spring tensioned limiting means or other forms of limiting means. The location of the swivel limiting means may vary from the described where the swivel limiting means fits generally within the upper wheel bracket or castor frame. Alternatively, for example, the swivel limiting means may be mounted above the castor and located between the wheel bracket or castor frame and the trolley frame. The location of the castor wheel assembly on the trolley may vary from that described where for example the castor wheel assemblies of this invention are placed diagonally opposite each other on the trolley frame. Alternative braking assemblies from that described may be fitted to the castor to aid in reversing the trolley. For example, on castor wheel assemblies such as twin wheel castors wherein a wheel is offset laterally from a rotational axis of the swivel shaft, a braking element may automatically or otherwise restrict rotation of the wheel in reverse. This braking assembly may be fitted to the left hand wheel of the left hand castor of the trolley, and likewise, to the right hand wheel of the right hand castor to facilitate swivelling of the castor away from engagement with the swivel limiting means upon reversal of the trolley. This means that the swivel limiting means does not adversely affect the reversing of the trolley.

All such variations and modifications are to be considered within the scope of the present invention the nature of which is to be determined from the foregoing description.

The invention claimed is:

1. A trolley comprising:
   a trolley frame; and
   a pair of castor wheel assemblies each mounted to the trolley frame proximal to a rear of the trolley frame, each of the pair of castor wheel assemblies including:
   a wheel bracket;
   a swivel shaft mounted to the trolley frame and about which the wheel bracket swivels; and
   a swivel limiting element operatively coupled to the wheel bracket or the swivel shaft and configured to:
   (i) enable swiveling of the wheel bracket without limitation in an outward direction relative to the trolley frame; and
   (ii) limit swiveling of the wheel bracket in an inward direction relative to the trolley frame and substantially beyond an offset angle of between about 15° to 35°,
   whereby one of the pair of castor wheel assemblies is limited in swiveling in the inward direction beyond the offset angle while the other of the pair of castor wheel assemblies is free to swivel in the outward direction for guided steering of the trolley frame.

2. The trolley of claim 1, wherein the offset angle for guided steering is between about 15° to 35°.

3. The trolley of claim 2, wherein the offset angle is about 35°.

4. The trolley of claim 1, which includes a preventer element mounted to the swivel shaft for engagement with the swivel limiting element which is operatively coupled to the wheel bracket to limit swiveling of the wheel bracket beyond the offset angle.

5. The trolley of claim 4, wherein the swivel limiting element includes a stopping element mounted to the wheel bracket and configured to engage the preventer element to limit swiveling of the wheel bracket substantially beyond the offset angle, the stopping element including a shaft opening which receives the swivel shaft for swiveling of the stopping element together with the wheel bracket.

6. The trolley of claim 5, wherein the stopping element includes a restraining element arranged to operatively engage either the wheel bracket or the preventer element to restrain swiveling of the wheel bracket as the wheel bracket approaches the offset angle, the restraining element including a biasing element connected to the stopping element to engage either the wheel bracket or the preventer element.

7. The trolley of claim 5, wherein each of the pair of castor wheel assemblies includes another biasing element operatively coupled between the wheel bracket and the swivel shaft to urge said bracket away from the offset angle.

8. The trolley of claim 7, wherein the other biasing element includes a torsion spring mounted about the swivel shaft and configured to operatively engage the stopping element and the preventer element.

9. The trolley of claim 1, which includes a preventer element mounted to the wheel bracket and configured to engage the swivel limiting element which is operatively coupled to the swivel shaft to limit swiveling of the wheel bracket beyond the offset angle.

10. The trolley of claim 9, wherein the swivel limiting element includes a stopping element mounted to the swivel shaft and configured to engage the preventer element to limit swiveling of the wheel bracket substantially beyond the offset angle, the stopping element including a restraining element configured to operatively engage either the wheel bracket or the preventer element to restrain swiveling of the wheel bracket as the wheel bracket approaches the offset angle.

11. The trolley of claim 10, wherein the restraining element includes a biasing element connected to the stopping element to engage either the wheel bracket or the preventer element.

12. The trolley of claim 5, which includes a release element operatively coupled to the swivel limiting element to disengage the stopping element from the preventer element to permit swiveling of the wheel bracket beyond the offset angle.

13. The trolley of claim 12, wherein the release element is connected to the stopping element to enable displacement of the stopping element from the preventer element for disengagement.

14. The trolley of claim 12, wherein the stopping element and the preventer element are configured so that on reverse movement of the wheel assembly a force between the stopping element and the preventer element is sufficient to disengage the stopping element and the preventer element from swiveling beyond the offset angle in said one direction.

15. The trolley of claim 1, which is selected from the group consisting of: a platform trolley, a shopping trolley and a pram or pusher.

16. The trolley of claim 2, which includes a preventer element mounted to the swivel shaft and configured to engage the swivel limiting element which is operatively coupled to the wheel bracket to limit swiveling of the wheel bracket beyond the offset angle.

17. The trolley of claim 3, which includes a preventer element mounted to the swivel shaft for engagement with the swivel limiting element which is operatively coupled to the wheel bracket to limit swiveling of the wheel bracket beyond the offset angle.

18. The trolley of claim 6, wherein each of the pair of castor wheel assemblies includes another biasing element operatively coupled between the wheel bracket and the swivel shaft to urge said bracket away from the offset angle.

19. The trolley of claim 6, which includes a release element operatively coupled to the swivel limiting element to disengage the stopping element from the preventer element to permit swiveling of the wheel bracket beyond the offset angle.

20. The trolley of claim 13, wherein the stopping element and the preventer element are configured so that on reverse movement of the wheel assembly a force between the stopping element and the preventer element is sufficient to disengage the stopping element and the prevent element from swiveling beyond the offset angle in said one direction.

\* \* \* \* \*